US005290451A

United States Patent [19]

Koster et al.

[11] Patent Number: 5,290,451

[45] Date of Patent: Mar. 1, 1994

[54] METHOD AND APPARATUS FOR PROCESSING MANURE

[75] Inventors: Iman W. Koster; Abraham Klapwijk, both of Bennekom, Netherlands

[73] Assignee: Ecotechniek B.V., Utrecht, Netherlands

[21] Appl. No.: 863,161

[22] Filed: Apr. 3, 1992

[30] Foreign Application Priority Data

Apr. 17, 1991 [EP] European Pat. Off. ........ 91200922.2

[51] Int. Cl.[5] ............ C02F 3/30

[52] U.S. Cl. ............ 210/605; 210/624; 210/630; 210/903; 210/906; 210/195.1; 210/195.3; 210/202

[58] Field of Search ............ 210/605, 610, 614, 621, 210/623, 624, 626, 630, 903, 906, 631, 195.1, 195.3, 202, 209, 220, 257.1, 259, 607

[56] References Cited

U.S. PATENT DOCUMENTS

| | | | |
|---|---|---|---|
| 3,654,147 | 4/1972 | Levin et al. | 210/903 |
| 3,730,887 | 5/1973 | Levin et al. | 210/630 |
| 4,173,531 | 11/1979 | Matsch et al. | 210/903 |
| 4,183,809 | 1/1980 | Klapwijk et al. | 210/903 |
| 4,655,925 | 4/1987 | Tabata et al. | 210/903 |
| 4,824,563 | 4/1989 | Iwahori et al. | 210/605 |
| 5,098,572 | 3/1992 | Faup et al. | 210/903 |
| 9,415,454 | 11/1983 | Fuchs | 210/903 |

FOREIGN PATENT DOCUMENTS

| | | |
|---|---|---|
| 0327184 | 8/1989 | European Pat. Off. . |
| 423889 | 4/1991 | European Pat. Off. . |
| 3605962 | 8/1987 | Fed. Rep. of Germany . |
| 3932640 | 4/1991 | Fed. Rep. of Germany . |
| 53-4353 | 1/1978 | Japan . |
| 2099807 | 12/1982 | United Kingdom . |

OTHER PUBLICATIONS

Water Science & Technology vol. 13, No. 9, Jun. 1981, Oxford-GB pp. 233-238.

Abwassertechnik vol. 38, No. 4/88, Apr. 1988, Wiesbaden-DE pp. 12-16.

Patent Abstract of Japan vol. 13, No. 137(C-582) Apr. 5, 1989 & JP-A-63 302 996 Dec. 9, 1988.

Patent Abstracts of Japan vol. 4, No. 34(C-3) Mar. 22, 1980 & JP-A-55 008 852 Jan. 22, 1980.

Patent Abstracts of Japan vol. 5, No. 114(C-64) Jul. 23, 1981 & JP-A-56 053 795 May 13, 1981.

Patent Abstracts of Japan vol. 7, No. 195(C-183 Aug. 25, 1983 and JP-A-58 098 195.

Patent Abstracts of Japan vol. 4, No. 34(C-3) Mar. 22, 1981 and JP-A-55 008 852 Jan. 22, 1980.

J. Spanjers & A. Kalpwijk-"On Line Meter for Respiration Rate", Aug. 1990 pp. 67-77.

*Primary Examiner*—Christopher Upton

*Attorney, Agent, or Firm*—Harness, Dickey & Pierce

[57] ABSTRACT

The invention relates to a method for processing manure, liquid manure and/or Kjeldahl-N containing waste water being subjected to a nitrification in an aerated reactor containing active sludge and to a denitrification in a high rate recirculation denitrification reactor (13) containing a very compact biomass capable of converting nitrate to nitrogen gas. The loading of the nitrification reactor (9) being controlled to obtain an optimal nitrification and denitrification, the effluent from the nitrification reactor (9) partially being passed to the denitrification reactor (13), adding a source of carbon to the effluent to be passed to the recirculation denitrification reactor (13) and passing another portion of the effluent stream from the nitrification reactor (9) to a separation step (19) to separate a sludge, the effluent from separation step (19) being passed to a discharge line denitrification reactor (37) under the addition of a carbon source if desired. The invention further relates to an apparatus constructed for this purpose.

38 Claims, 10 Drawing Sheets

EFFLUENT
23
38
NITROGEN GAS
SEDIMENTATION TANK
17
EFFLUENT DENITRIFICATION
41
37
SURPLUS SLUDGE
42
SEPARATION
36
19
29
SLUDGE
C-SOURCE
14
FEED
7
33
23
BUFFER & SEDIMENTATION TANK
33
NITROGEN GAS
17
NITRIFICATION
9
41
RECIRCULATION DENITRIFICATION
13
12
SURPLUS SLUDGE
42
39
23
BUFFER & SEDIMENTATION TANK
40
SURPLUS SLUDGE
12
7
FEED
C-SOURCE
14

1
2
3
4
5
6
7
8
9
10
11
12
13
14
15
16
17
33

33
9
7
17
12
16
13
10
18
14
---- CONTROL LINES
—— LIQUID LINES
-·-·- OPTIONAL LIQUID LINES 31
30
26
27
28
29

17
16
7
8
13
32
14
9
12
18
10

16
17
7
8
33
13
9
14
12
18
10

17
16
13
7
8
33
9
32
14
12
18
10

17
16
13
7
8
33
32
9
14
12
20
18
10

17
19
21
16
22
13
7
8
34
35
9
14
12
20
18
10

21
19
22
16
17
13
7
8
33
32
9
14
12
20
18
10

8
33
16
25
16
17
23
13
7
32
9
10
12
18
19
11
23
15
14
21
24

SEPARATION
38
NITROGEN GAS
FEED
33
NITROGEN GAS
EFFLUENT
7
17
17
19
29
SLUDGE
NITRIFICATION
EFFLUENT DENITRIFICATION
RECIRCULATION DENITRIFICATION
37
9
13
39
12
C-SOURCE
14
C-SOURCE
14

33
FEED
NITROGEN GAS
EFFLUENT
NITROGEN GAS
7
38
17
17
NITRIFICATION
EFFLUENT DENITRIFICATION
RECIRCULATION DENITRIFICATION
37
9
13
SEPARATION
12
36
39
19
29
C-SOURCE
14
SLUDGE
C-SOURCE
14

NITROGEN GAS
EFFLUENT
38
17
33
NITROGEN GAS
17
EFFLUENT DENITRIFICATION
37
NITRIFICATION
9
RECIRCULATION DENITRIFICATION
13
SEPARATION
36
39
12
19
29
7
C-SOURCE
14
SLUDGE
FEED

33
FEED
7
NITROGEN GAS
EFFLUENT
38
17
NITROGEN GAS
17
EFFLUENT DENITRIFICATION
37
NITRIFICATION
9
RECIRCULATION DENITRIFICATION
13
SEPARATION
36
39
12
19
29
7
C-SOURCE
14
SLUDGE
FEED
C-SOURCE
14

NITROGEN GAS
17
33
RECIRCULATION DENITRIFICATION
13
C-SOURCE 14
BUFFER & SEDIMENTATION TANK
23
12
7
FEED
41
42
SURPLUS SLUDGE
9
NITRIFICATION
33
FEED
7
12
BUFFER & SEDIMENTATION TANK
23
40
SURPLUS SLUDGE
39
SEPARATION
29
SLUDGE
19
36
C-SOURCE 14
NITROGEN GAS
17
EFFLUENT DENITRIFICATION
37
38
SEDIMENTATION TANK
23
41
42
SURPLUS SLUDGE
EFFLUENT

METHOD AND APPARATUS FOR PROCESSING MANURE

BACKGROUND AND SUMMARY OF THE INVENTION

The present invention relates to a method for processing manure, liquid manure and/or Kjeldahl-N containing waste water, being subjected to a nitrification in a first step and to denitrification in a subsequent step. An aerated reactor which contains active sludge rich in nitrifying bacteria is used in the nitrification step with acid-neutralizing chemicals being added to said reactor if necessary. A high rate denitrification reactor, which contains a very compact biomass which is capable of converting nitrate to nitrogen gas and to which an organic substrate is added, is used in the denitrification step. A method of this type is known from, inter alia, Agrarisch Dagblad of 14 March 1988. With this method the liquid fraction of fermented semi-liquid manure is treated. The biologically degradable organic substances, nitrifiable nitrogen and phosphorus, which are present in the liquid fraction of anaerobic or fermented semi-liquid manure can be largely removed. The method essentially consists in a coupling of a nitrification step in a nitrification reactor in which ammonia is converted by bacteria to oxidized nitrogen with a denitrification step in a denitrification reactor in which oxidized nitrogen is converted by bacteria to nitrogen gas, the phosphate present in the liquid being concentrated as a chemical precipitate in the reactor at the same time. Oxidation of ammonia results in lowering of the pH, which with this method can be countered by metering in lime and/or metering in effluent from the denitrification reactor (recycling) to the nitrification reactor. During the nitrification step of this method there will also be some removal of nitrogen and phosphate by means of nitrogen and phosphate incorporation in the new cells of the active sludge. This nitrogen and phosphate was liberated during the fermentation of the manure whereby degradable substances yield $CO_2$ and $CH_4$. With this method the nitrification reactor (which can be either a fed batch reactor or a batch reactor) is operated batchwise. It is then aerated until all ammonia has been nitrified, after which the aeration is stopped temporarily in order to allow the sludge to settle. The nitrified liquid manure is run off for treatment in the denitrification step, while the active sludge remains behind in the nitrification reactor for a subsequent cycle. In the denitrification step the effluent from the nitrification reactor is pumped upwards through a USB (upflow sludge bed) reactor. In this reactor there is a very compact biomass which is capable of converting nitrate to nitrogen gas. In order to allow this step to proceed, an organic substrate—for example methanol—must be added to the reactor. Acid is consumed during the denitrification step, as a result of which the pH in the bacterial bed rises. As a consequence of this rise, an insoluble precipitate of phosphate with the calcium ions present in the liquid forms. The manure processing consisting of manure fermentation and separation of fermented manure, followed by the method for treatment of the liquid fraction of fermented semi-liquid manure, which has been described above, is shown in FIG. 1. (The numerals of this and the following FIGURES are explained in Table A).

A number of manure processing works are being developed at present, for example Promest in Helmond. In these works semi-liquid manure is evaporated to give a dry product, which costs a great deal of energy since semi-liquid manure consists of more than 90% water. Moreover, this evaporation is a complex technology which in fact still has to be developed for use on manure. The cost price of processing of this type for the formation of dry granular or powder manure is consequently very high.

An approach which differs from that described above is the treatment of semi-liquid manure in conventional effluent treatment installations. Currently this is also being used for treatment of liquid manure from calves. The conventional manure treatment has the significant disadvantages that the process produces a large amount of sludge (excess bacteria) and that the process is not capable of removing the phosphate. This means that extra provisions have to be made for sludge treatment and dephosphating. A conventional manure treatment also requires a fairly large amount of space.

This method, as reported in Agrarisch Dagblad of 17 March 1988, has the advantage that it is relatively inexpensive and can be carried out in a compact installation. However, a number of problems also arise in this case in the treatment of fermented manure.

A compact manure treatment installation for manure and fermented manure or Kjeldahl-N containing waste water can be produced and maintained only if:

a) the metering of the fermented liquid fraction is matched to the nitrification capacity of the nitrification reactor. The nitrification reactor must not be overloaded but must also not operate underloaded.
b) The metering of methanol (or other sources of carbon) to the denitrification reactor is matched to the nitrate load in the denitrification reactor. In the case of undermetering not all nitrate is removed; in the case of overmetering, however, methanol (or other source of carbon) is present in the effluent to be discharged.
c) The effluent recycling from denitrification reactor to nitrification reactor is controlled such that it is optimal. Too little recycling leads to a nitrate concentration which has an inhibitory effect on the bacteria; too much recycling has the consequence that the reactor is filled mainly with liquid which has already been treated.

Said points can be achieved by the use of separate instruments, it being necessary to carry out some of the diverse operations by hand. Moreover, the results of the various measurements cannot be integrated and translated into a control action without the intervention of one operator. Furthermore, the effluent from the nitrification reactor can still contain organic substances which cannot be further degraded in the nitrification reactor. Organic material which passes into the denitrification reactor can be converted into inorganic material in that reactor with the liberation of ammonium nitrogen which is then (insofar as it is not fed via the recycle stream) discharged with the effluent.

The aim of a copending European application 90.202728.3 is to eliminate these problems. It relates to a method of the type indicated in the preamble which is characterized in that the loading of the nitrification reactor is controlled and the optimum nitrification and denitrification are obtained on the basis of one or more of the following data:

the incoming nitrogen load;

the information from the WAZU respiration meter (described below);

the pH in the nitrification reactor, the criterion for which is that it is in the range limited by 6 and 8.5;

the amount of air required the residence time the temperature in both the nitrification reactor and the denitrification reactor, the criterion for which is that this is lower than 40° C.;

the concentration of oxidized nitrogen in the influent for the denitrification reactor, the criterion for which is that the concentration is between 0 and 4 g N/1;

the concentration of oxidized nitrogen in the nitrification reactor, the criterion for which in the sludge/-liquid mixture in the reactor is that the concentration is between 0 and 4 g N/1;

the concentration of the carbon source in the effluent from the denitrification reactor;

the gas production in the denitrification reactor.

An aspect of this process may include the use of an instrument, a respiration meter (WAZU respiration meter). Using the respiration meter, the time at which the treatment processes are complete can be established and both the Kjeldahl-N concentration in the liquid fraction of fermented manure to be treated and the nitrate concentration of the effluent from the nitrification reactor (=feed for the denitrification reactor) can be calculated. However, it should be noticed that the use of such a respiration meter is not required. The other data mentioned are also sufficient for a good control of the process. The liquid streams and control lines in relation to the respiration meter are shown schematically in FIG. 2. The respiration meter can control the entire method automatically on the basis of the data collated and calculated by the instrument. However, as already mentioned, such a respiration meter is certainly not necessary.

The nitrification is followed by a denitrification process.

Furthermore, the optimal conditions for the treatment methods have been investigated in both the nitrification and the denitrification reactor. The biomasses in both the nitrification reactor and the denitrification reactor produce heat. Because of the high concentration of biomass and the high rates of conversion which are realized in both reactors, there will be a net excess of heat in both reactors if no measures are taken. It was found in laboratory experiments, that for a nitrifying bacterial population the optimal temperature of this bacterial population is between 31 and 35° C. and that the maximum temperature which can be tolerated is 40° C. On the basis of general scientific information, it can be anticipated that the same temperature limits apply for the denitrifying bacterial population. Thermophilic denitrifying bacteria are known. These operate at temperatures above about 50° C. However, for various reasons it is not desirable to use thermophilic organisms in the denitrification reactor: the effluent to be discharged will be much too warm and the recycle stream to the nitrification reactor may not be too warm. Both the nitrification and the denitrification reactor can be operated only if there is a provision for removal of heat from the respective reactor contents by a suitable means or due to cooling to the air by a suitable design.

For the present method, the conditions in the denitrification reactor must be kept such that phosphate can precipitate. The efficiency of the phosphate removal is dependent on the pH and the $HCO_3^-/CO_2^{2-}$-ratio in the denitrification reactor.

The desired pH can be obtained by using an organic carbon source for the denitrification reactor with a specific chemical oxygen consumption (COC)/total organic carbon (TOC) ratio in the present method. The fact is that alkalinity (alkali, bicarbonate and carbonate) is produced in the denitrification reactor under the influence of the denitrification reaction. The production of alkalinity is dependent on the COC/TOC ratio of the organic carbon source in the denitrification reaction. Usually methanol is used as an organic carbon source. Methanol has a high COC/TOC ratio and results in a higher production of alkalinity than, for example, glucose, which has a much lower COC/TOC ratio. Experiments have shown that the COC/TOC ratio must be above 3.75.

As stated, the pH falls in the nitrification reactor on the oxidation of the ammonia. To counter acidification of the reactor, an alkali can be metered in or effluent can be recycled from the denitrification reactor to the nitrification reactor. It has been established experimentally that the concentration of oxidized nitrogen in the nitrification reactor in the sludge/liquid mixture is between 0 and 4 g N/1 and preferably is been found that the concentration of oxidized nitrogen in the influent for the denitrification reactor is between 0 and 4 g N/1 and is preferably between 1.0 and 1.4 g N/1. In order to achieve this, the effluent from the denitrification reactor can be of oxidized nitrogen at the feed location in the reactor. Furthermore, this recycling is intended to obtain a higher stream velocity in the denitrification reactor, which promotes the contact between biomass and substrate in the reactor. Recycling can take place directly from effluent stream to influent stream for the denitrification reactor. It is, however, also possible (and in fact better for the overall process) for recycling of effluent from the denitrification reactor to be used, this recycling taking place entirely or partially via the nitrification reactor. The aim of this is then to achieve both a saving in the chemicals consumption for pH control in the nitrification reactor and to achieve a dilution of the reactor contents of the nitrification reactor such that the content of oxidized nitrogen is always lower than 4 g N/1.

Another aspect is the use of a separation step, e.g. a physical/chemical flocculation step and a floccule separator or a membrane technology after the nitrification step. The purpose of said separation previous to the denitrification reactor is catching suspended and colloidally dissolved organic substances, that otherwise would mineralize in the denitrification reactor resulting in the formation of ammonia nitrogen. A physical/-chemical flocculation step plus floccule separation is shown schematically in FIG. 3. The residual organic substance can be removed from the effluent with the aid of flocculating adjuvants and a process for separation of the flocculent from the effluent. By positioning the separation upstream of the denitrification step, the organic substances can be removed before they are converted to inorganic substances and ammonium nitrogen is formed. A further advantage of this is that the carbonate content in the effluent from the nitrification reactor is low (lower than in the effluent from the denitrification) reactor, to which organic substrate is added). This is advantageous if a flocculating adjuvant is used which forms a precipitate with carbonate. If a flocculating adjuvant is used which contains cations which precipitate with phosphate, an additional phosphate removal is performed.

The copending application also relates to an installation which is suitable for carrying out the method as described above, comprising:

- a nitrification reactor which is provided with aeration, feed of liquid to be treated, feed of acid-neutralizing chemicals, active sludge rich in nitrifying bacteria, sludge discharge, effluent discharge;
- a line through which the effluent from the reactor can be fed to the denitrification reactor;
- a denitrification reactor which is provided with feed of effluent from the nitrification reactor, feed of a carbon source, an upflow sludge bed (USB) column, a very compact biomass capable of converting nitrate to nitrogen gas, phosphate-rich sludge discharge, effluent discharge, nitrogen gas discharge;
- a line through which the effluent from the denitrification reactor can be discharged.

In the most simple form, the installation (shown schematically in FIG. 2) consists of the combination of a batch reactor (to which all influent (7) is added at once per cycle) or a fed batch reactor (to which the influent is added gradually or stepwise per cycle) as nitrification reactor (9) and a continuously fed upflow sludge bed (USB) reactor as denitrification reactor (13). The two reactors are operated connected in series, without bypass of the nitrification reactor (9) but optionally with backmixing (33) from the denitrification reactor (13) to the nitrification reactor (9).

The use of the WAZU respiration meter (18) (described below), a measurement and control unit with which the course of the respiration rate of the biomass in the reactor (9) is followed, is characteristic of the installation according to the copending application.

The nitrification reactor (9) of the apparatus is provided with aeration (10), a feed of liquid (7) to be treated, a sludge discharge (11), effluent discharge and optionally a feed of effluent from the denitrification reactor (33), all of which are controlled by the WAZU respiration meter (18) (Netherlands Patent Application 86.00396, filed on 6 February 1986). This respiration meter also controls the metering of the source of carbon (14) for the denitrification reactor (13). This denitrification reactor is additionally provided with nitrogen gas discharge (17) and effluent recirculation (33) or discharge (16) (see FIGS. 2 and 5).

Another embodiment of the installation according to the copending application (shown schematically in FIG. 4) is also provided with a line (32) through which the effluent from the denitrification reactor (13) can be partially recycled to the effluent (12) from the nitrification reactor (9) which serves as influent for the denitrification reactor (13) and additionally this installation is provided with a feed of one or more acid-neutralizing chemicals (8) to the nitrification reactor (9).

Furthermore, the apparatus can comprise a combination of the two above installations (FIGS. 4 and 5), i.e. an installation as shown in FIG. 6, this installation being provided with lines through which the effluent (16) from the denitrification reactor (13) can be partially recycled (lines 33 and 32 respectively) to the nitrification reactor (9) and to the effluent (12) from the nitrification reactor (9) which serves as influent for the denitrification reactor (13).

The three last mentioned installations, shown in FIGS. 4, 5 and 6, can comprise a further addition (see FIG. 7) in the form of a feed of chemicals for phosphate precipitation (20).

Furthermore, all of these installations (shown in FIGS. 4, 5, 6 and 7) can be provided with one or more separation or flocculation installations (19). The flocculation installation as such is shown schematically in FIG. 3.

The apparatus according to the copending application which have already been described can be provided with the flocculation installations at various locations (FIGS. 8, 9 and 10). In the installation according to FIG. 8, the flocculation installation (19) is positioned in such a way that the effluent (16) from the denitrification reactor (13) flows through the flocculation installation (19 and FIG. 3) upstream of the recycle (34,35) or discharge (22).

In the installation according to FIG. 9, the flocculation installation (19) is positioned in such a way that only the effluent (16) from the denitrification reactor (13) which is to be discharged flows through the flocculation installation (19).

In the installation according to FIG. 10, which is preferred, the flocculation installation (19) is positioned in such a way that the effluent (12) originating from the nitrification reactor (9) flows through the flocculation installation (19) before it flows into the denitrification reactor (13).

The apparatus according to the copending application in which the nitrification reactor is provided with feed of the effluent (33,34) from the denitrification reactor (13) can be provided with a spray installation (25 in FIG. 10) through which the effluent (33 or 34) from the denitrification reactor (13) can be sprayed into the nitrification reactor (9) to prevent foam formation.

Furthermore, all installations according to the copending application can be provided with one or more buffer tanks (23) (FIG. 10).

In the above process, all effluent (12) from the nitrification reactor passes through the separator (19), this means a high load for the separator.

DETAILED DESCRIPTION OF THE PREFERRED EMBODIMENTS

It has now been found that an improvement can be reached by partially recirculating the effluent (12) from the nitrification reactor (9) to a recirculation denitrification reactor (13), adding a source of carbon to the effluent to be passed to the recirculation denitrification reactor (13) and passing part of the effluent stream (12) from the nitrification reactor (9) to a separation unit (19) to separate sludge, the effluent (36) from the separation step (19) is passed to another denitrification reactor (37). This other denitrification reactor (37) shall be referred to as the discharge line denitrification reactor (37). A source of carbon should be added to the discharge line. The effluent (38) from the discharge line denitrification reactor (37) can be discarded. The scheme of the apparatus is shown in FIG. 11.

The following advantages are achieved:

DETAILED DESCRIPTION OF THE PREFERRED EMBODIMENTS

Figure 1:
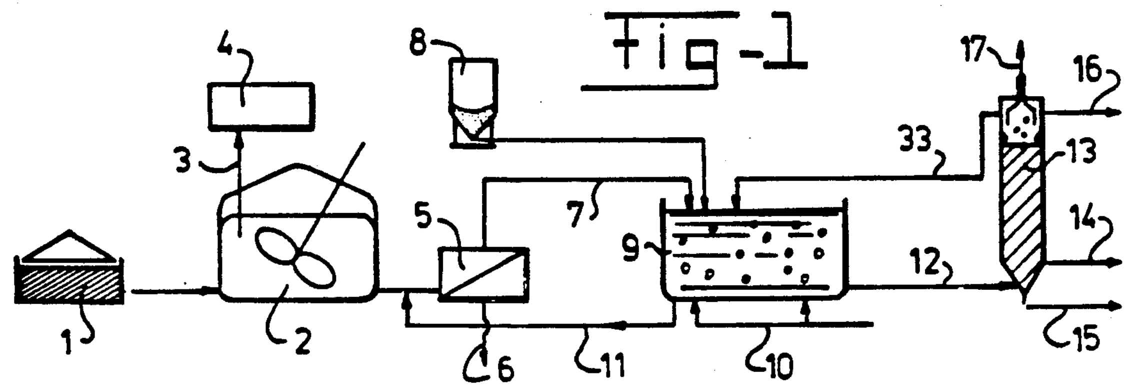
FIG. 1 is a process flow schematic of processing manure, including fermentation of manure and separation of fermented manure followed by treatment of the liquid fraction of fermented semi-liquid manure.
Figure 2:
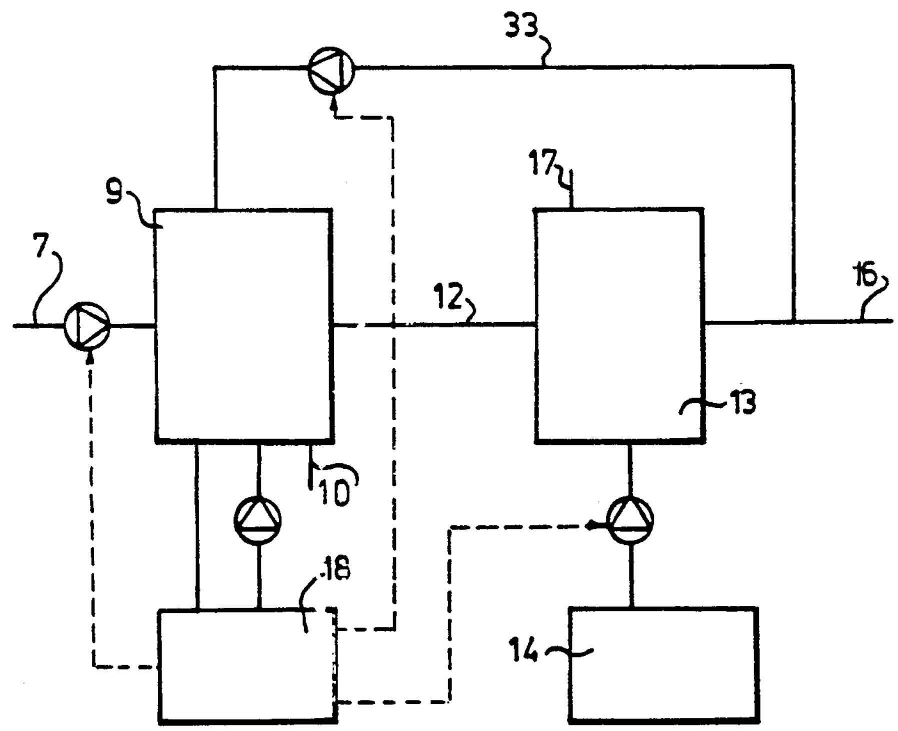
FIG. 2 illustrates a control schematic of a respiration meter used in connection with a nitrification reactor and a denitrification reactor in the processing of manure.
Figure 3:
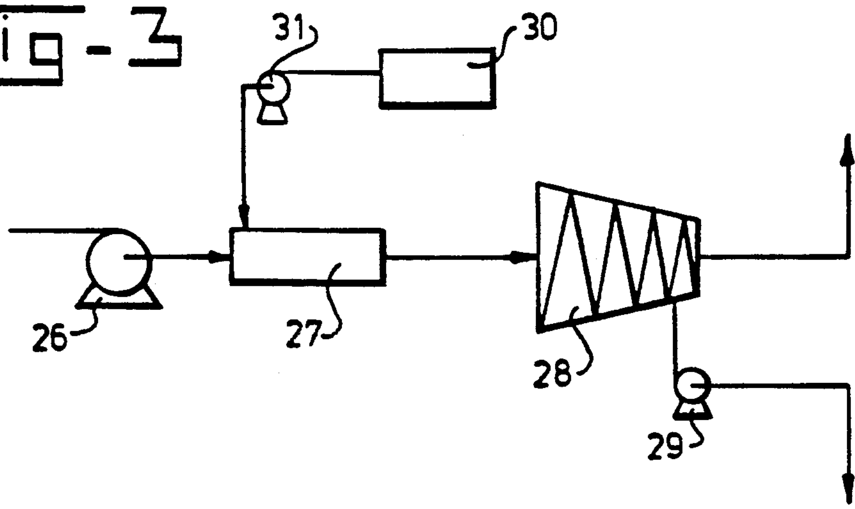
FIG. 3 schematically illustrates a physical/chemical flocculation step and floccule separation.
Figure 4:
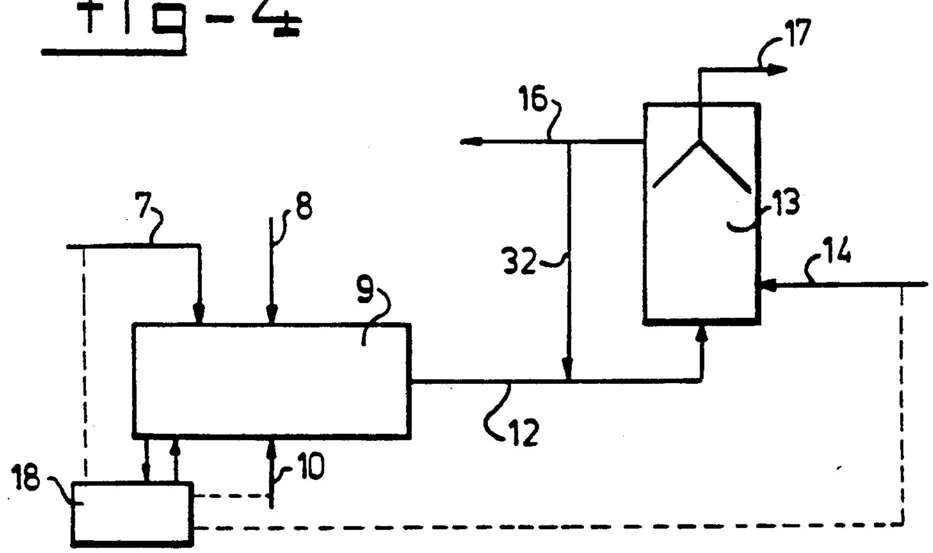
FIG. 4 illustrates a process flow schematic of processing manure.
Figure 5:
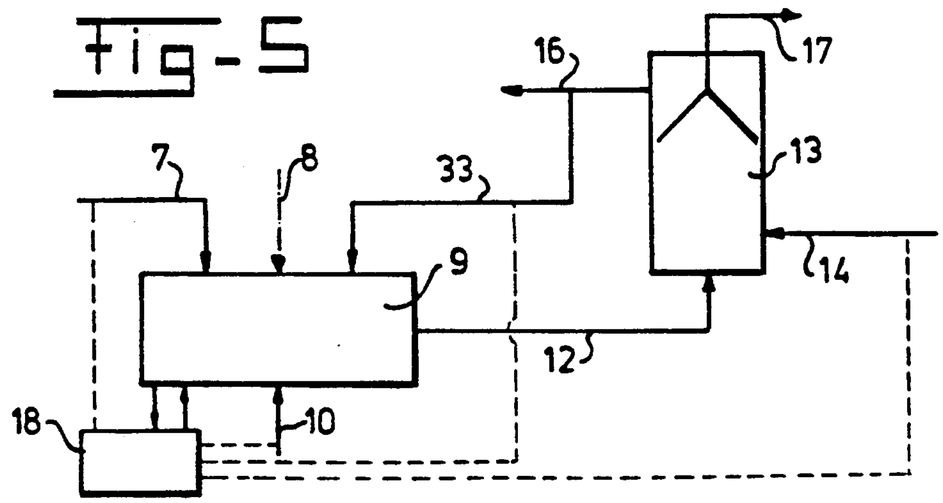
FIG. 5 illustrates a variation on the process flow schematic shown in FIG. 4.
Figure 6:
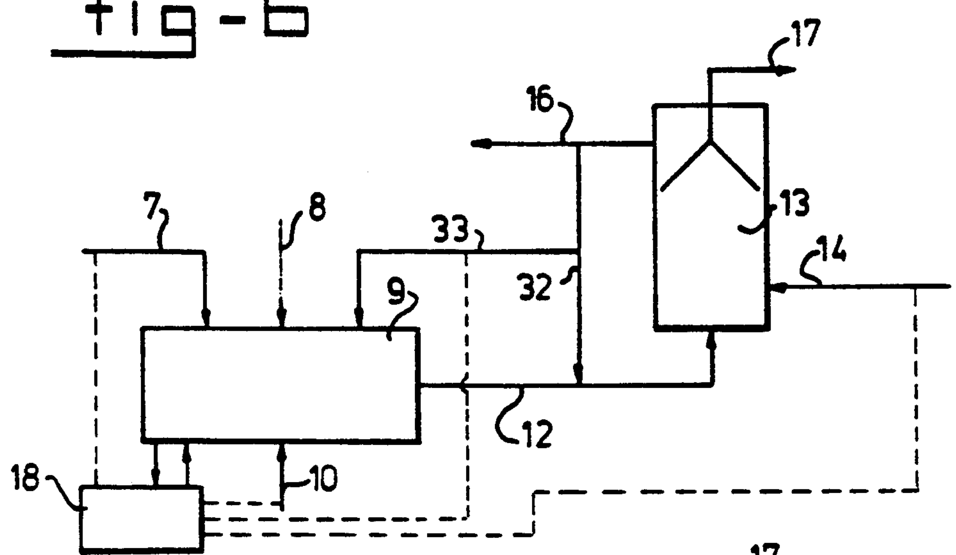
FIG. 6 shows a process flow schematic of processing manure which comprises a combination of features from FIGS. 4 and 5.
Figure 7:
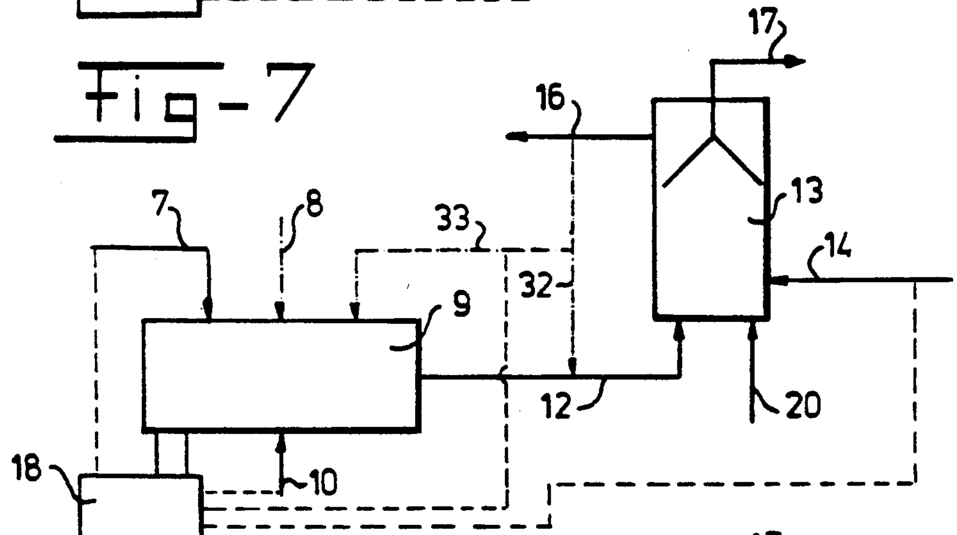
FIG. 7 is a process flow schematic of processing manure which includes means for providing a feed of chemicals for phosphate precipitation.
Figure 8:
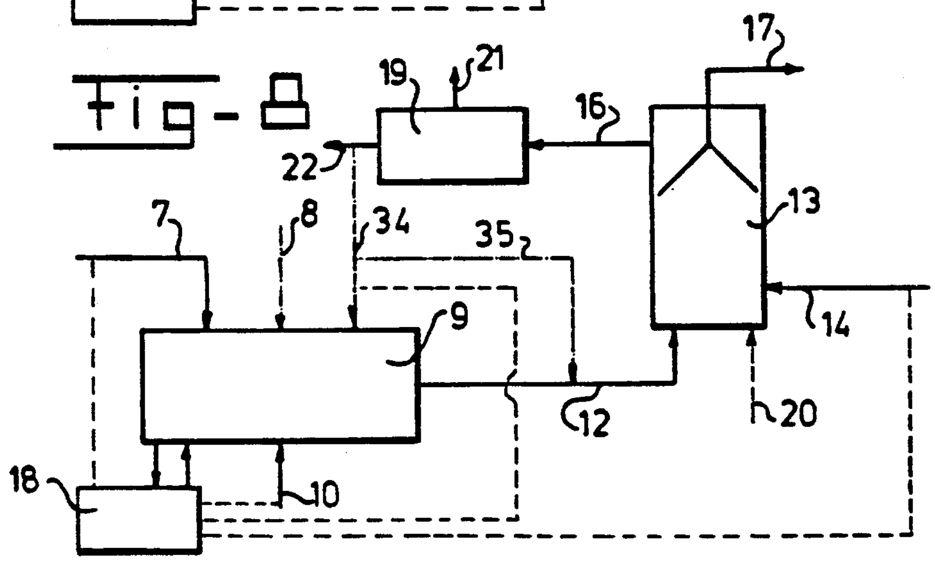
FIG. 8 is a process flow schematic of processing manure wherein the flocculation installation is positioned so that the effluent from the denitrification reactor flows through the flocculation installation upstream of the recycle or discharge.
Figure 9:
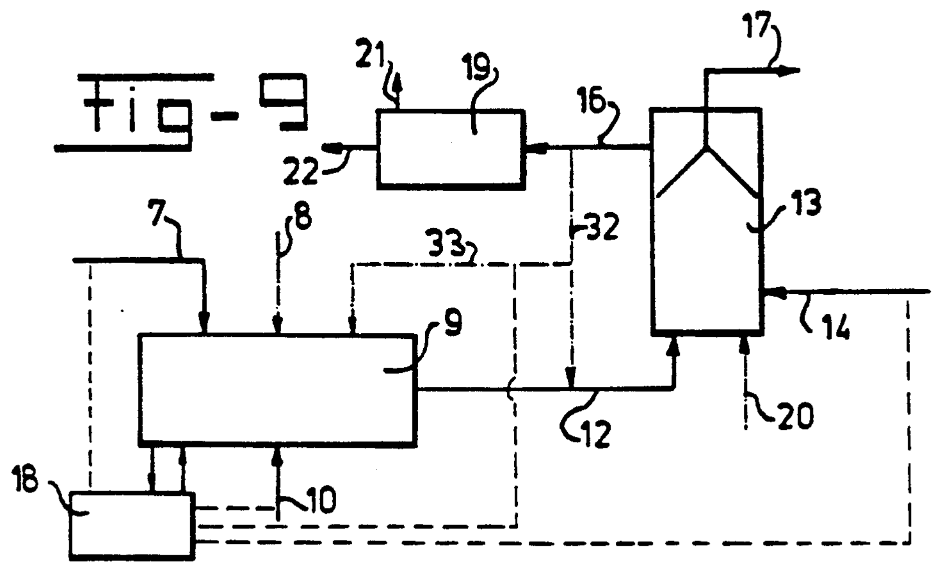
FIG. 9 is a process flow schematic of processing manure wherein the flocculation installation is positioned so that only the effluent from the denitrification reactor which is to be discharged flows through the flocculation installation.
Figure 10:
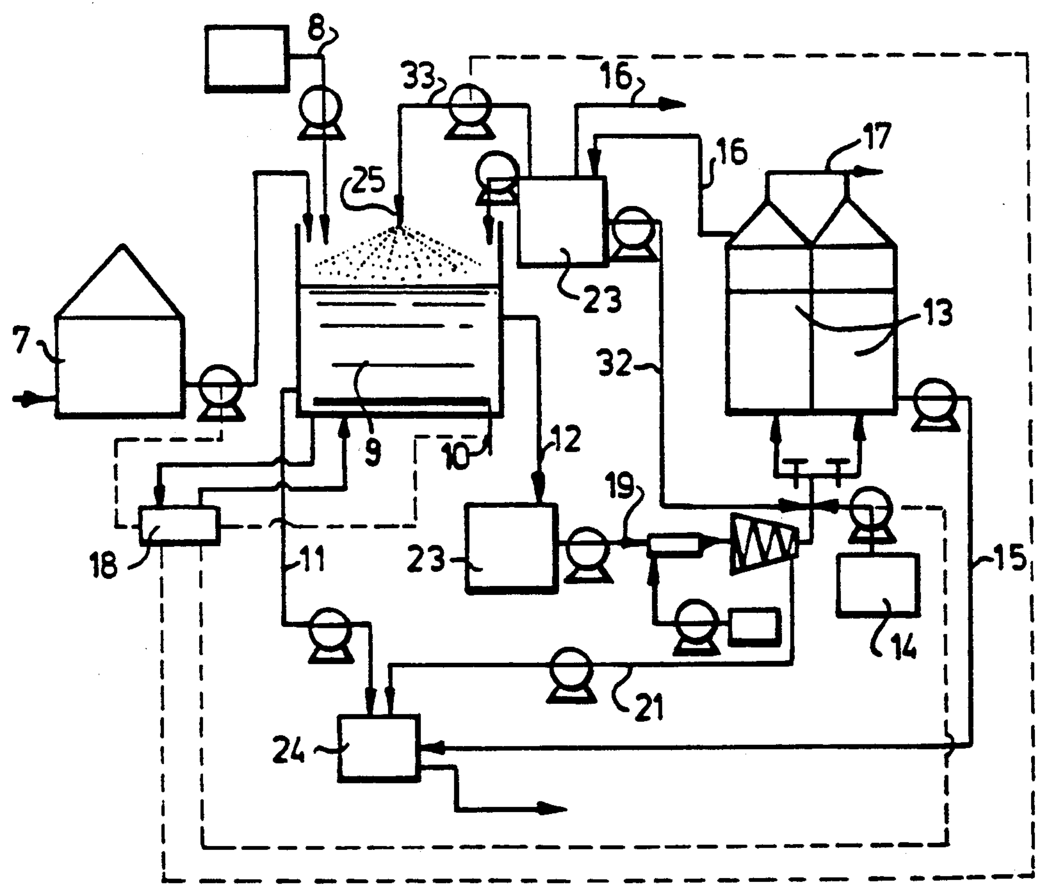
FIG. 10 shows a process flow schematic of processing manure wherein the flocculation installation is positioned so that the effluent originating from the nitrification reactor flows through the flocculation installation before it flows into the denitrificaiton reactor.
Figure 11:
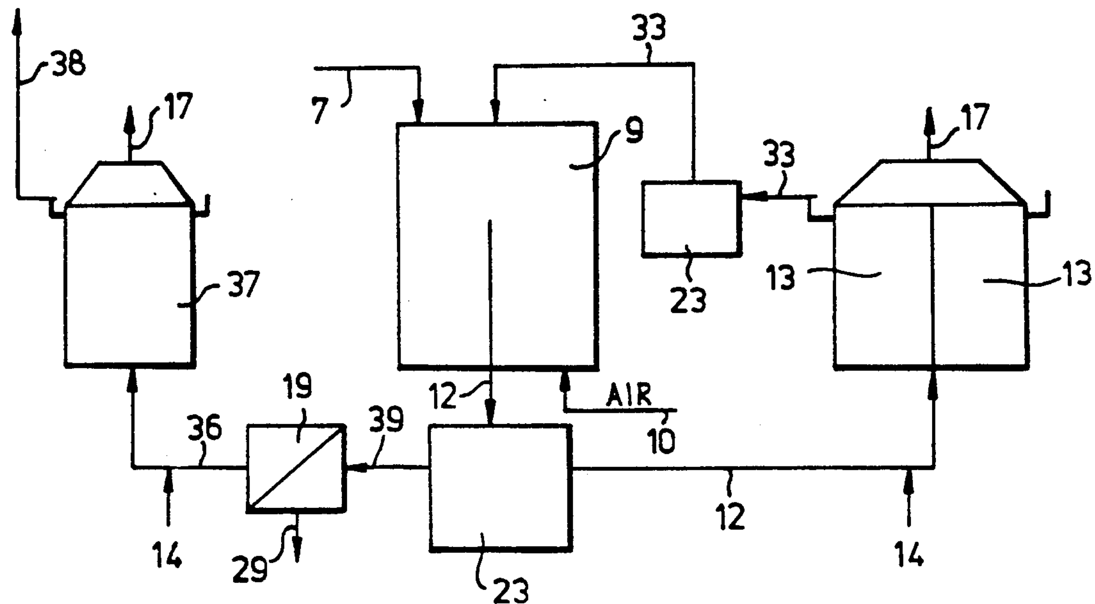
FIG. 11 illustrates a process flow schematic of processing manure in accordance with an embodiment of the invention.

It has now been found that an improvement can be reached by partially recirculating the effluent (12) from the nitrification reactor (9) to a recirculation denitrification reactor (13), adding a source of carbon to the effluent to be passed to the recirculation denitrification reactor (13) and passing part of the effluent stream (12) from the nitrification reactor (9) to a separation unit (19) to separate sludge, the effluent (36) from the separation step (19) is passed to another denitrification reactor (37). This other denitrification reactor (37) shall be referred to as the discharge line denitrification reactor (37). A source of carbon should be added to the discharge line. The effluent (38) from the discharge line denitrification reactor (37) can be discarded. The scheme of the apparatus is shown in FIG. 11.

The following advantages are achieved:

a) The recirculation denitrification reactor does not need to achieve 99.0% removal, 90–95% suffices. The effluent from the recirculation denitrification reactor is not eluted. Mineralization of organic N to $NH_4$-N is no problem as the effluent is returned to the nitrification reactor.

b) The influent to be treated comprises a source of carbon. By (partially) adding the influent to the recirculation denitrification reactor the C-source that is present can be used for the denitrification process. The $NH_4N$ that is present in the influent is added to the nitrification reactor via the recirculation. By using the available C-source, costs involved with an external C-source can be reduced. Furthermore, the breakdown of the C-source results in a lower oxygen demand in the nitrification reactor.

c) The separation step for removal of phosphates and suspended and colloidal dissolved organic steps is only necessary for effluent as opposed to the complete recirculation stream of the copending application.

Surprisingly it has been found, that sludge present in the effluent (12) recirculated to the recirculation denitrification reactor (13) and subsequently recirculated to the nitrification reactor (9) has no disadvantageous effect on the process.

The process is especially suited for processing manure (that can be fermented) or Kjeldahl-N containing waste water.

The above process can be improved by using two different types of denitrification reactors; the discharge line denitrification reaction (37) and the recirculation denitrification reactor (13). The effluent (12) from the nitrification reactor (9) is partially recirculated from the nitrification reactor to the recirculation denitrification reactor (13). An organic carbon source can be added to the influent of this denitrification reactor (13) in order to provide sufficient organic carbon substrate for the denitrification reaction in said reactor (13).

In the lay-out of the apparatus of the invention it is no longer detrimental if the effluent of the recirculation denitrification reactor (13) still contains a small amount of nitrate, amino acids, organic N or organic matter. This because the effluent (33) from this reactor (13) is passed to the nitrification reactor (9). The metering of the organic carbon source in this denitrification reactor (13) is less critical than in the process of the copending application.

By using two different types of denitrification reactors it is also possible to add the feed at the influent of the recirculation denitrification reactor (13), i.e. between where the effluent stream (12) from the nitrification reactor (9) is split to (12) and (39) and the recirculation denitrification reactor (13). By doing this it is possible to use the organic material which is in the feed as a carbon source for the denitrification process thereby eliminating the need for a separate carbon source (14) before the recirculation denitrification reactor (13). The ammonium in the feed will pass unchanged through the recirculation denitrification reactor (13) and will be added by the recirculation stream (33) at the nitrification reactor (9). Here the ammonium will be oxidized to nitrate. Most of the oxidizable organic matter in the feed stream will be used for denitrification. If there is still some oxidizable organic matter left in the effluent stream (33) of the recirculation denitrification reactor (13) this organic matter will be oxidized in the nitrification reactor (9). The other part of the effluent (12) of the nitrification reactor (9) is passed to the discharge line denitrification reactor (37).

Figure 12:
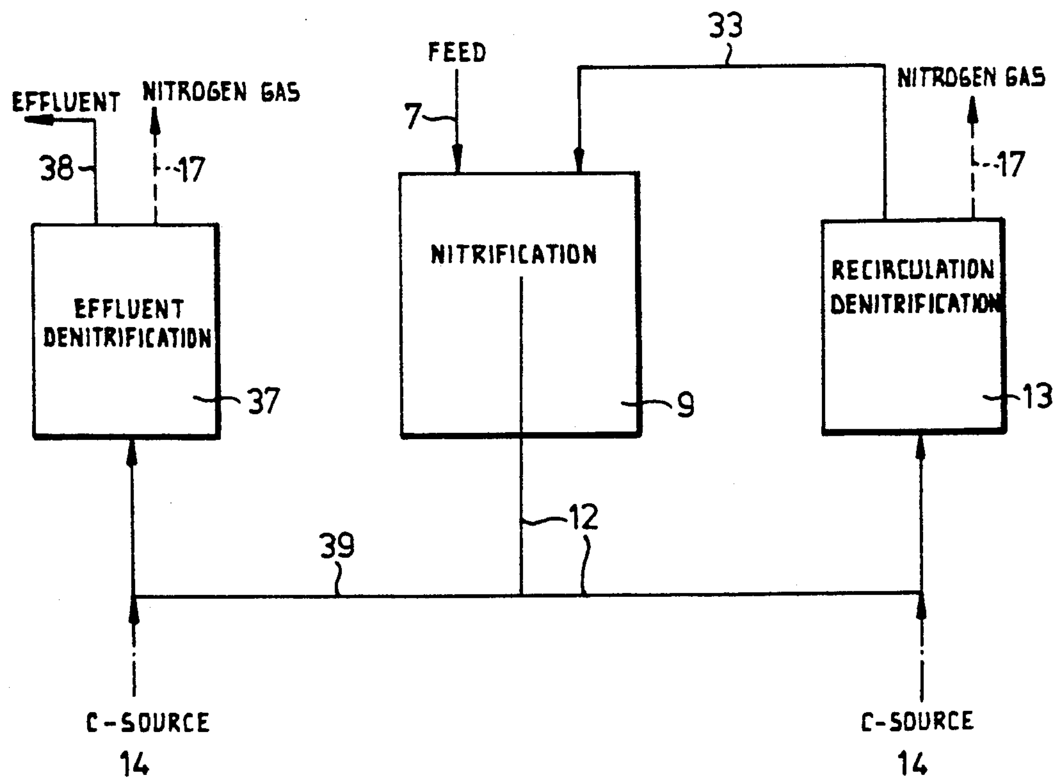
FIG. 12 is a flow diagram illustrating the processing manure in accordance with an embodiment of the invention.
Figure 13:
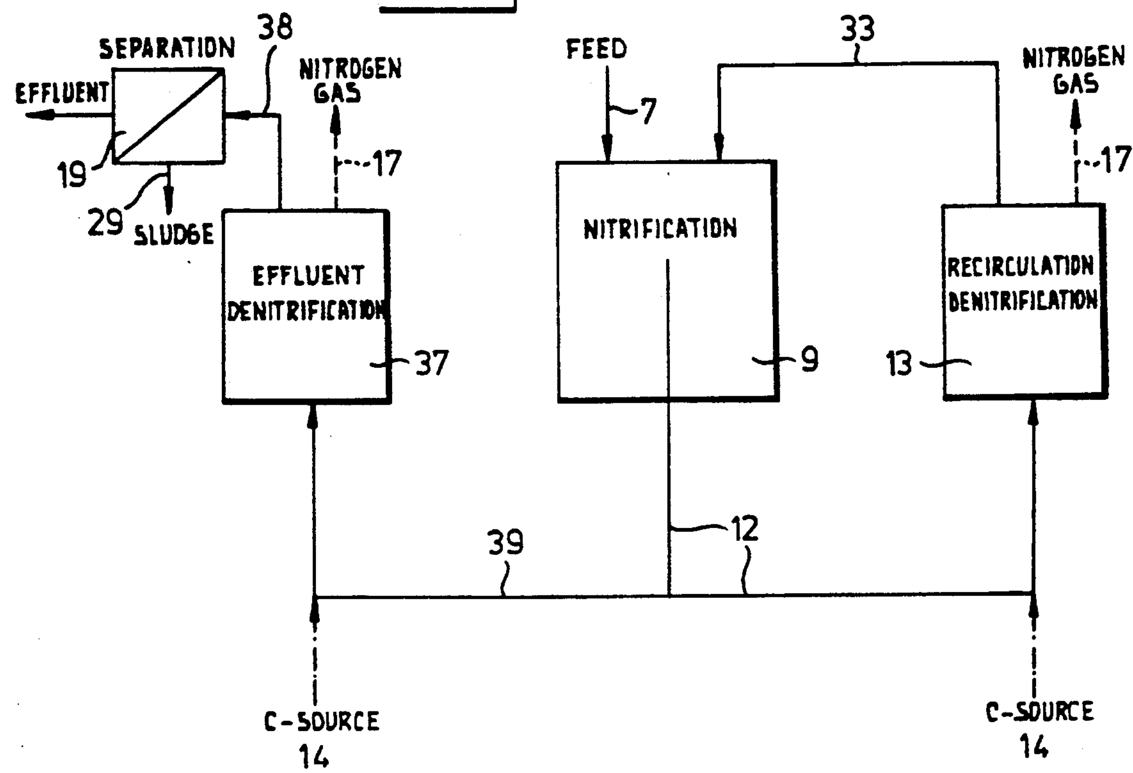
FIG. 13 is a slightly modified flow diagram, similar to the diagram of FIG. 12.
Figure 14:
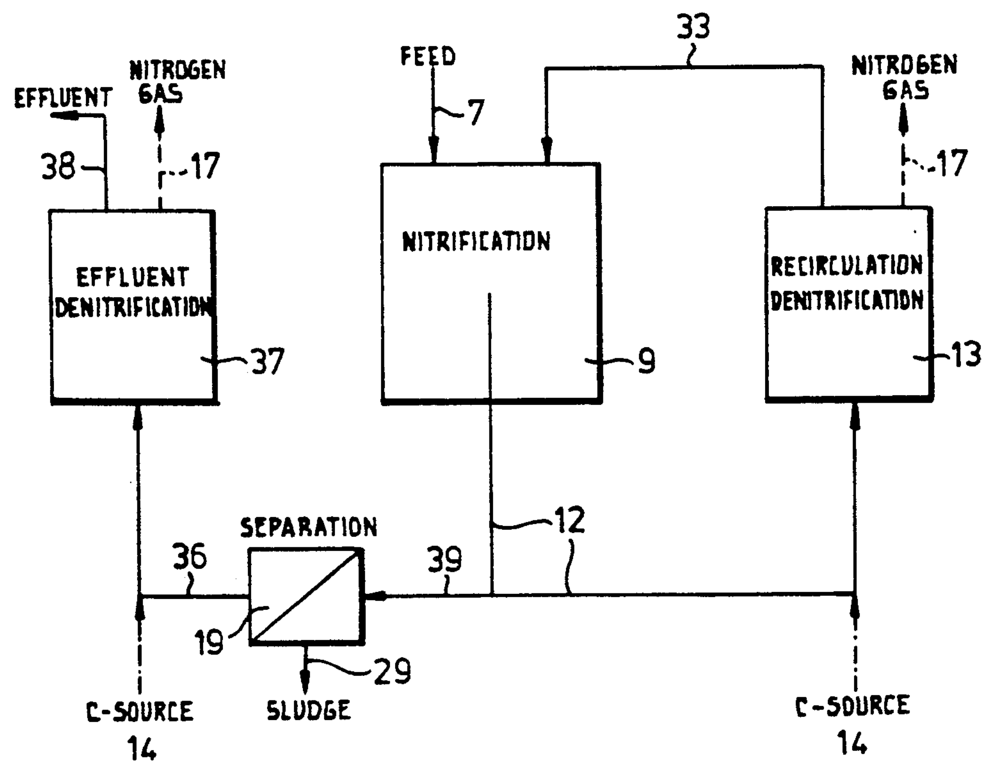
FIG. 14 is a slightly modified flow diagram, similar to the diagram of FIG. 12.
Figure 15:
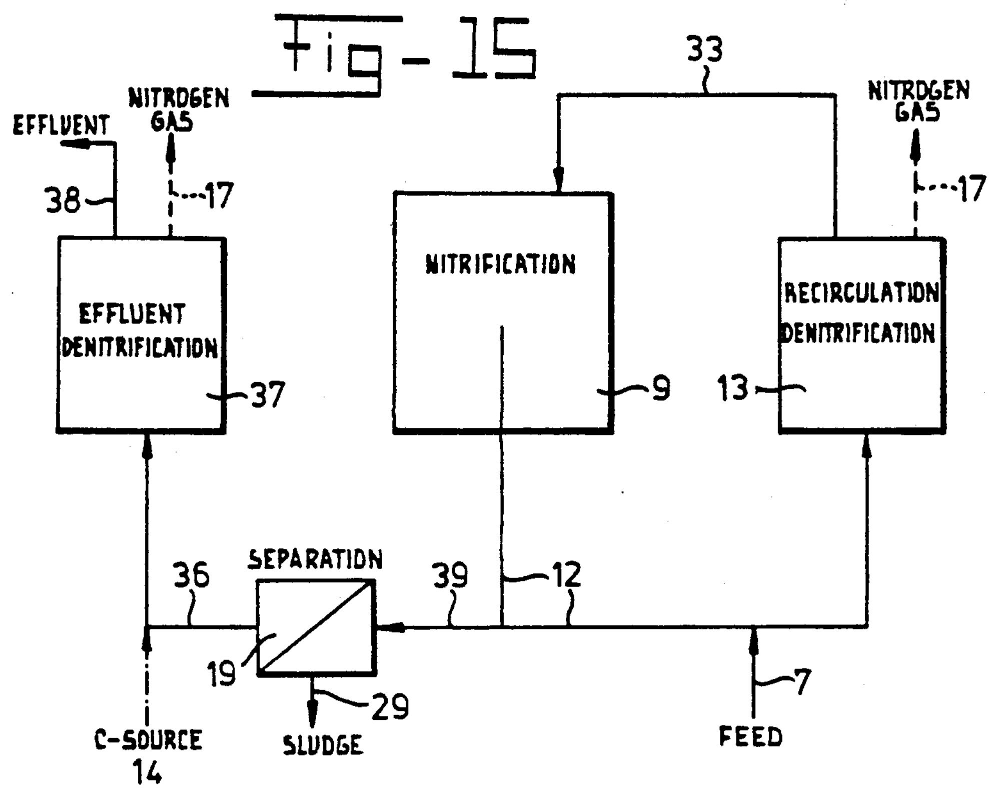
FIG. 15 is a slightly modified flow diagram, similar to the diagram of FIG. 12.

An organic carbon source should also be supplied to the influent of the discharge line denitrification reactor (37). Of course it is not advisable to use part of the influent to be treated according to the process of the invention as organic carbon source as the effluent (38) of this discharge line denitrification reactor (37) is to be discarded whilst still containing the Kjeldahl nitrogen that should be removed. This embodiment using part of the influent of the system can only be used in recirculation denitrification reactor (13). The flow diagram is shown in FIG. 12. As already has been elucidated above, a separation step can be used for the removal of phosphates and suspended and colloidally dissolved organic substances. In the process of the invention with a recirculation denitrification reactor (13) and a discharge line denitrification reactor (37) the separation step (19) can be positioned before the discharge line denitrification reactor (37) and after the effluent (12) from the nitrification reactor (9) has been split into influent stream (39). The hydraulic load of the separation step is then much lower than in the copending application. This is shown in FIG. 13. However, when the separation step (19) is placed downstream of the discharge line denitrification reactor (37) some ammonium and biodegradable soluble organic substances are still formed from organic material in the discharge line denitrification reactor (37). These soluble organic biodegradable substances and ammonium will pass unchanged through the separation step (19) and will be discarded. By placing the separation step (19) upstream of the discharge line denitrification reactor (37) the organic matter will be removed before passing through the discharge line denitrification reactor (37), so that no ammonium or soluble organic substances will be formed here. This is shown in FIG. 14.

The effluent (12) of the nitrification reactor (9) will partially be put through the recirculation denitrification reactor (13). To this part of effluent (12) destined for the recirculation denitrification reactor (13) the feed with organic matter and ammonium will be added, so that the nitrate in this part of the effluent (12) from the nitrification reactor (9) will be denitrified here. The other part of the effluent (12) of the nitrification reactor (9) passes through the separation step (19), if this is necessary in view of pollution exigencies A carbon source (19) is added to the effluent (36) of the separation step (e.g. methanol). This stream is then put through the discharge line denitrification reactor (37), where the nitrate is converted into nitrogen gas. The effluent (38) of this reactor is then discarded. This is shown in drawing 15.

By adding the feed at the influent of the recirculation reactor (13) the recirculation ratio (=amount of influent for the recirculation denitrification reactor (13) without feed divided by the amount of feed) is determined by several points:

- the nitrate concentration in the nitrification reactor (9) should be less than 1.5 g N/1;
- the amount of alkalinity in the effluent (33) of the recirculation denitrification reactor (13) should be enough to counter acidification in the nitrification reactor (9);
- the use of an external carbon source (e.g. methanol should be limited);
- the hydraulic loading of the nitrification reactor (9) and the recirculation denitrification reactor (13) should not be too big.

To meet these points it can be necessary to add a part of the feed at the nitrification reactor (9) and another part to the influent of the recirculation denitrification reactor (13). In this case it can be necessary to add also an external carbon source (14) such as methanol to the recirculation denitrification reactor (13) (Shown schematically in drawing 16). This process can be operated with or without a separation step.

Furthermore, the process can be provided with one or more buffer tanks. The buffer tank (23) in which the effluent (12) from the nitrification reactor (9) is collected can be constructed like a sedimentation tank, so that surplus sludge from the nitrification reactor (9) can settle here and can be removed. The effluent from this buffer tank is partially passed through the recirculation denitrification reactor (13) and partially passed through the separation step (19).

The effluent (33) from the recirculation denitrification reactor (13) can be collected in a buffer tank (23). This buffer tank can also be constructed like a sedimentation tank, so that sludge still present in the effluent (33) of the recirculation denitrification reactor (13) can settle here. This sludge (41) can be returned to the reactor, or can be removed as surplus sludge. The effluent from this buffer tank is put in the nitrification reactor.

The effluent (33) of the discharge line denitrification reactor (13) can also be collected in a sedimentation tank. The sludge still present in the effluent (33) of the discharge line denitrification reactor can settle here and be returned to the denitrification reactor (41) or can be removed as surplus sludge (42). The effluent from this sedimentation tank will be discharged. This is schematically shown in drawing 17.

It will be clear that this different lay out of the installation can be used with all the embodiments described above. According to a beneficial embodiment an amount of influent can be used as a carbon source.

According to the present invention the separation unit (19) can use the conventional separation methods such as centrifugation, sedimentation and so forth, however, also the use of membrane technology is possible. In this case the filtration is applied followed by a phosphate removal by precipitation.

Another possibility to remove organic material is chemical oxidation using ozone or hydrogen peroxide, for instance.

The following description relates to the WAZU respiration meter from Netherlands Patent Application No. 8600396.

As is known, oxygen-consuming biochemical reactions such as substrate oxidation, nitrification, and formation and degradation of cell material and reserve substances take place in an active sludge suspension. These reactions result in an overall oxygen consumption of the suspension and the rate at which said oxygen consumption takes place is therefore a good measure of the biological activity of the sludge. Said rate, expressed in mass of oxygen per unit volume and unit time is termed respiration rate.

For the purpose of biological waste water purification it is of importance to be able to measure the respiration rate of active sludge. This can be illustrated by a few examples:

The respiration rate may be used as a basis for a better process control. Thus, an optimum matching of the aeration to the oxygen consumption makes it possible, on the one hand, to save energy costs for the aeration and, on the other hand, to match the effluent quality to the standards imposed thereon.

A sudden decrease in the respiration rate measured in a small-scale test reactor in which partial flows of influent and return sludge are combined is an indication that the influent has an acutely toxic effect on the active sludge. This observation may then result in actions which prevent process breakdown.

In the investigation of the toxicity and a biological degradability of environmentally extraneous substances in active sludge, measurement of the respiration rate will provide important information.

The above examples imply the desirability of a reliable continuous method of measuring the respiration rate which preferably can be used on line with a view to automation.

Methods of measurement known from the state of the art are the methods using the manometric principle, i.e. based on the measurement of the volume of oxygen consumed. Since the introduction of the manometric respiration measurement, various methods have been conceived for improving said measurement. The most well-known embodiment is the Warburg one (Jenkins, D., 1960, "The use of manometric methods in the study of sewage and trade wastes" in: Waste Treatment, Pergamon Press, New York), in which the volume of gas is kept constant. General disadvantages of the manometric methods are:

sensitivity to temperature and pressure fluctuations, the performance of the measurement is time-consuming and requires considerable experience, and unsuitability for continuous application and automation.

After the introduction of the amperometric oxygen concentration measurement by means of the Clarck cell (Mancy K H., Okun D., and Reilley C.N., 1962, "A galvanic cell oxygen analyser"; J. Electroanal. Chem., 65-92), the manometric methods have been superseded by the electrochemical respiration measurements. These are based on measuring the concentration of dissolved oxygen in an active sludge suspension. The measurement of the oxygen concentration is relatively simple and lends itself to on-line applications. It is possible to correct for the effects of temperature and pressure fluctuations in a relatively simple manner. A distinction can broadly be made between two methods: the batchwise or "closed" respiration measurement and the continuous or "open" respiration measurement.

Batchwise methods are the most used. In this case, the respiration rate is determined by measuring the rate of decrease of the oxygen content in a sludge sample after switching off the aeration and sealing it off from the atmosphere (e.g. Pagge, U., and Günthner W., 1981, "The BASF toximeter- a helpful instrument to control and monitor biological waste water treatment plants"; Wat. Sci. Tech. 13, 233-238). However, said method has the disadvantage that continuous measurements are not possible.

In an open respirometer aeration takes place. An equilibrium is established between the supply and the consumption of oxygen. If the oxygen supply coefficient (Kla) is known, the respiration rate can be calculated directly from the measured oxygen concentration (Holmberg U. and Olsson G., 1985, "Simultaneous estimation of oxygen transfer rate and respiration rate"; Modelling and control of biotechnological processes, Preprints/Proceedings lst IFAC Symposium, Noordwijkerhout, 11-13 December 1985). The value of Kla can in principle be determined by experimental sampling. The problem in this case is, however, that said quantity depends on various process factors and, in addition, is a function of the respiration rate.

It has been found that the disadvantages known from the state of the art outlined above to effect the electrochemical respiration measurements can be eliminated if the respiration rate is determined by measuring the oxygen content in the continuous process current, before and after residence thereof in a respiration chamber which is completely filled with liquid and sealed off from the atmosphere.

Figure 19:
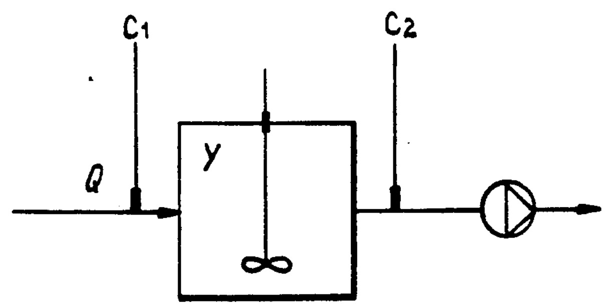
FIG. 19 shows a respiration meter which may be used in connection with this invention for measuring the oxygen content in a continuous process stream.

FIG. 19 shows an embodiment of the method. To the respiration chamber, for example a vessel, which is sealed off from the atmosphere, having a capacity V and completely filled with liquid, a flow rate Q of an active sludge suspension is fed into it via a supply line. Just before the suspension is fed into said chamber, the oxygen content is measured by means of an oxygen measuring cell $C_1$ and the same measurement is performed by an oxygen measuring cell $C_2$ when the suspension leaves the unaerated chamber. The theoretical average residence time can be determined using the formula V/Q and the respiration rate by means of the formula $(C_1-C_2)\ Q/V$. A prerequisite for such a measurement is that the oxygen content of the suspension should be sufficiently high, it being assumed that the content of the unaerated chamber may be regarded as ideally mixed.

It has appeared, however, that two separate oxygen measuring cells may exhibit a different response characteristic and ageing pattern. According to a specific embodiment this problem can be eliminated if the respiration rate is determined by measuring the oxygen content in the continuous process current at a single measuring point in the incoming and outgoing current respectively of the respiration chamber sealed off from the atmosphere and completely filled with liquid in relation to the process current fed in or fed back.

Figure 20:
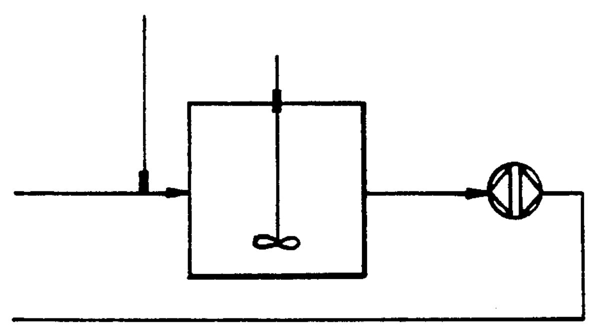
FIG. 20 shows a respiration meter for carrying out a method of measuring oxygen content in a continuous process stream.

FIG. 20 shows a device for carrying out this preferred method of measurement. In addition to the unaerated respiration chamber, for example a vessel, which is provided with supply and drainage lines, the device comprises an oxygen measuring cell inserted next to said chamber and a pump with a reversible direction of rotation. By pumping the sludge suspension alternately in both directions, the oxygen content is measured in turn in aerated sludge and in sludge which has not been aerated for a (residence) time. The respiration rate can be calculated in the manner described above.

Another embodiment is based on reversing the direction of flow by means of a valve switching system. Any problems in measuring the oxygen concentration can be eliminated by stirring the liquid below the oxygen measuring cell.

An important aspect in the precise interpretation of the measurement data is the hydraulic behavior of the measuring system according to the invention. The reason for this is that the sludge in the vessel reflects a situation which always lags behind the situation in the fresh sludge by a residence time and cannot therefore be compared with it as such. The hydraulic behavior is determined by measurements of residence time. Once the hydraulic model has been established, the respiration rate can be determined at any instant from the measured oxygen concentration.

Figure 21:
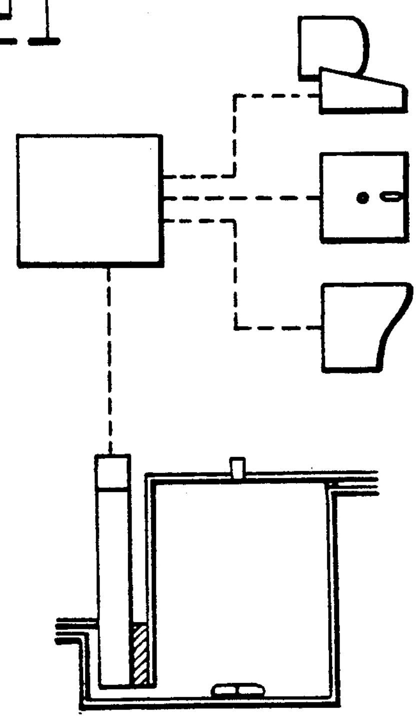
FIG. 21 schematically shows an arrangement for measuring the oxygen content.

The respirometer can be coupled to a digital measuring and regulation system (for example, Siemens SMP modular system) which provides for the measurement of oxygen concentration, the calculation of the respiration rate and the regulation of the frequency with which the direction of rotation of the pump is reversed. The maximum frequency of reversal is determined by the rate at which the signal from the oxygen measuring cell reaches an equilibrium value. The possibility of automatically correcting the measured value of the oxygen concentration for changes in atmospheric pressure is incorporated in the control program. FIG. 21 shows a diagram of the measurement arrangement in which (101) denotes the supply line of an unaerated vessel, (102) denotes the unaerated vessel, (103) denotes the drain line from the unaerated vessel, (104) denotes a magnetic stirrer, (105) denotes the oxygen measuring cell, (106) denotes the SMP system, (107) denotes a keyboard and monitor coupled to said system, (108) denotes a data storage bank and (109) denotes a printer.

The presence of computer facilities makes it possible to determine quantities related to the respiration rate in an indirect manner. Thus, the biochemical oxygen consumption of a waste water can be calculated by integrating the measured respiration rate with respect to time. Moreover, it is possible to perform on-line process regulation on the basis thereof.

The invention is illustrated by means of the following example that only serves for illustrative purposes and is not limiting for the scope of the invention.

EXAMPLE

Fermented manure (i.e. the liquid fraction obtained by centrifugation of anaerobic fermented liquid pig manure) is treated in the apparatus of FIG. 11.

Analysis of the fermented manure shows a COD concentration of 21000 mg/1, a nitrogen concentration of 6500 mn N/1 and a phosphorus concentration of 275 mg P/1.

The apparatus shown in FIG. 11 consists of a nitrification reactor (9) having a usable volume of 50 $m^3$, two recirculation denitrification reactors (13) which are positioned parallel to each other each having a usable sludge bed volume of 10 $m^3$, a separator (19) comprising at least a pipe flocculator (38) and a centrifuge (5) and a discharge line denitrification reactor (37) having a usable sludge bed volume of 5 $m^3$.

The nitrification reactor in this example is a fed batch fermented manure. A total of 2 $m^3$ is added in four steps.

In the total cyclus of the nitrification reactor 8 $m^3$ of effluent (33) of the recirculation denitrification reactors are supplied by sprayers proportionally distributed in time. After a total of 2 $m^3$ fermented manure has been introduced in the nitrification reactor and all ammonium nitrogen has been nitrified the aeration is ended and activated sludge is allowed to sediment during sixty minutes. After the sedimentation period 10 $m^3$ of the supernatant liquid is discharged as an effluent (12) of the nitrification reactor. Then a new cyclus is started wherein again 2 $m^3$ of fermented manure and 8 $m^3$ of effluent of the denitrification are added.

A WAZU respiration meter (trade mark RA-1000 marketed by Manotherm) is coupled to the nitrification reactor to monitor the actual respiration velocity. Further the oxygen concentration in the nitrification reactor is monitored with an oxygen sensor.

The blower which is used for the supply of oxygen by means of air is controlled by the oxygen concentration in the nitrification reactor. The oxygen concentration is kept at 1.0 mg/1.

Figure 18:
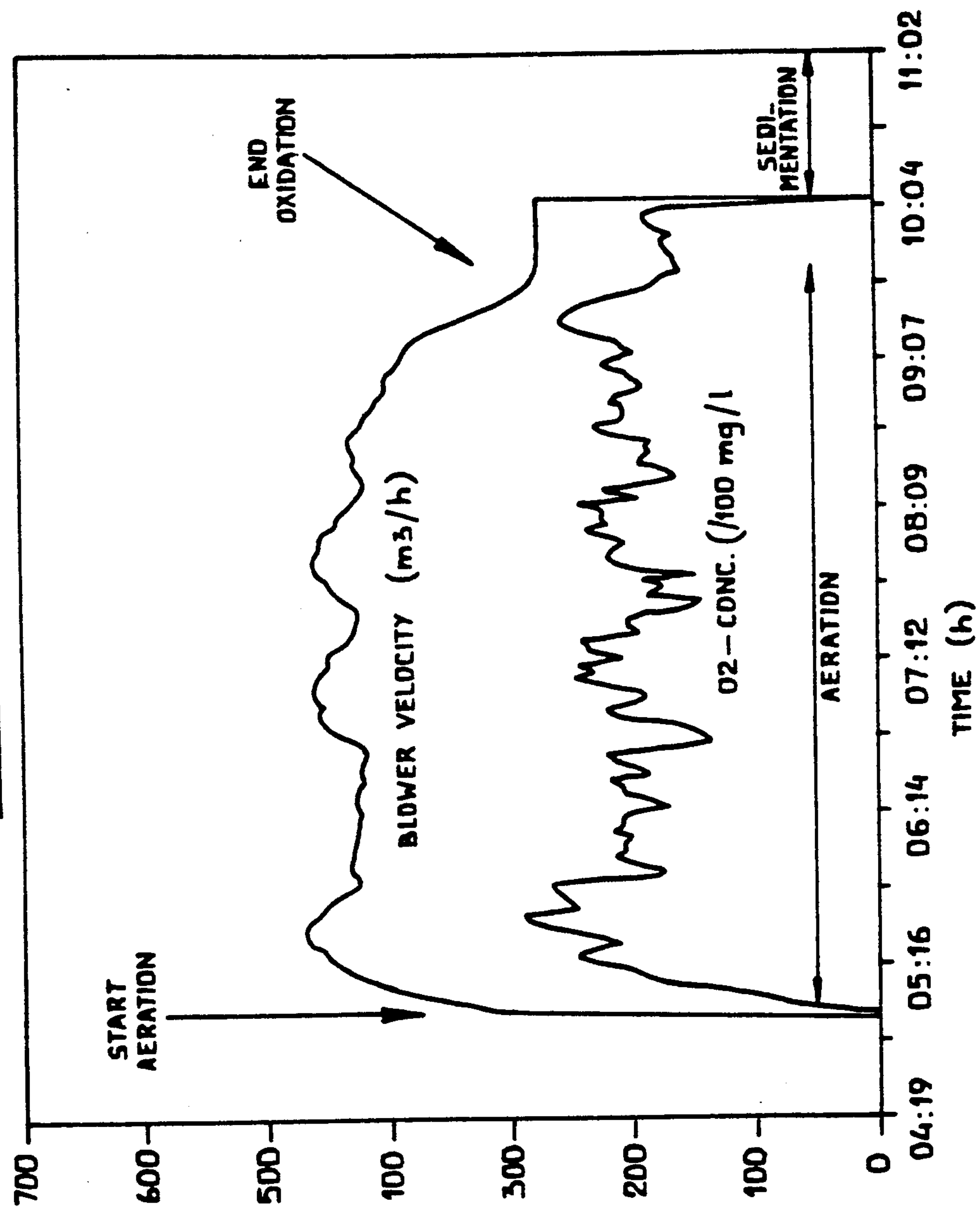
FIG. 18 illustrates a process cycle for the present invention showing the blower velocity and oxygen concentration over time for a single treatment cycle.

After addition of 0.5 $m^3$ of fermented manure the actual respiration velocity increases and the blower velocity increases also to keep the oxygen concentration at 2.0 mg/1. When the ammonium added with the fermented manure is nitrified the actual respiration velocity decreases to the basis level and the blower velocity has to decrease as well. After falling underneath the setpoint for the respiration velocity and/or the setpoint for the blower velocity another 0.5 $m^3$ of fermented manure is added to the nitrification reactor. FIG. 18 gives the oxygen concentration and the blower velocity as a function of time. The average dose of the fermented manure in the present nitrification reactor was in this test about 6 $m^3$ a day.

The pH value is also measured in the nitrification. Lime milk is supplied when the pH-value falls below 6.5. The temperature is also monitored and is kept at a value below 33° C. by means of a heat exchanger.

The effluent (12) of the nitrification reactor (9) has a nitrate-N concentration of 1100 mg N/1 and a phosphate-P concentration of 125 mg P/1. The nitrate-N concentration is lower than could be expected on the basis of the dilution of the reactor contents with effluent from the denitrification reactor. This is the consequence of some denitrification in the nitrification reactor during the sedimentation period and the incorporation of nitrogen in the biomass.

The effluent (12) of the nitrification reactor is collected in a buffer tank (23). This tank is constructed like a sedimentation tank, so that sludge still present in the effluent (12) of the nitrification reactor, can sediment here.

Four-fifths of the contents of the buffer tank are put through two recirculation denitrification reactors (13) that have been arranged parallel. Methanol is added on the basis of the nitrate-N-concentration in the influent stream of the recirculation denitrification reactors (13). The methanol dose is about 1.65 kg/$m^3$ influent of the denitrification reactor. The denitrification process is monitored by means of the gas production (1630 1/h). The pH-value of the recirculation denitrification reactors is between 9.0 and 9.3. The temperature is kept below 35° C. by means of a heat exchanger.

The effluent (33) of these two denitrification reactors is collected in a buffer tank (23). From this buffertank the effluent is pumped through sprayers, which are situated on top of the nitrification reactor, or in the nitrification reactor.

One-fifth of the effluent (12) from the nitrification reactor (9) is used as influent stream (39) and is pumped through a separation system comprising at least a pipe flocculator. At the beginning of this flocculator a 38 w % (weight/weight) solution of $FeC1_3$ (iron(III)chloride) is dosed in an amount of 10 1/$m^3$ effluent of the nitrification reactor (9). In the middle of the pipe flocculator lime milk or caustic soda is supplied until the pH-value is 5.5. At the end of the pipe flocculator polyelectrolyte is dosed (180 mg per $m^3$ effluent of the nitrification reactor). The liquid then passes through a centrifuge separating in a liquid stream (36) and a sludge stream (29). The sludge production is about 0.36 $m^3$/d. The nitrate-N concentration and phosphate-P concentration in the effluent of the centrifuge amount 1100 mg N/1 and <0.5 mg P/1 respectively.

The effluent (36) of the separation step (19) is then put through the discharge line denitrification reactor (37). Methanol is added on basis of the nitrate-N concentration in the influent stream. The denitrification process is monitored by means of the gas production (408 1/h). The pH value is below 9.0. Temperature is kept below 35° C. by means of a heat exchanger.

The effluent (38) of the denitrification (37) is put through a sedimentation tank and is discharged.

TABLE A

Explanation of the numerals in the FIGURES

1. Storage of semi-liquid manure
2. Fermentation installation
3. Biogas
4. Installation for energy generation
5. Installation for separation
6. Cake
7. Filtrate =liquid fraction to be treated
8. Holder for metering acid-neutralizing chemicals
9. Nitrification reactor
10. Air supply
11. Sludge discharge
12. Effluent from the nitrification reactor
13. Recirculation denitrification reactor
14. Holder for metering C source
15. Phosphate-rich sludge
16. Effluent from the recirculation denitrification reactor
17. Nitrogen gas
18. WAZU respiration meter
19. Separation installation
20. Holder for chemicals for phosphate precipitation
21. Sludge, flocculated material
22. Effluent discharge from the flocculation installation, positioned downstream of the recirculation denitrification reactor.
23. Buffer tank
24. Storage of discharged sludge
25. Spray installation
26. Influent pump
27. Static mixer and/or flocculating tank
28. Centrifuge
29. Sludge pump
30. Iron chloride storage
31. Metering pump
32. Effluent originating from the recirculation denitrification reactor which recycles to said recirculation denitrification reactor
33. Effluent originating from the recirculation denitrification reactor which recycles to the nitrification reactor
34. Effluent originating from the separation step, which is positioned downstream of the recirculation denitrification reactor, which flows to the nitrification reactor
35. Effluent originating from the separation step, which is positioned downstream of the recirculation denitrification reactor, which recycles to said recirculation denitrification reactor
36. Effluent originating from the separation step, which is positioned upstream of the discharge line denitrification reactor.
37. Discharge line denitrification reactor.
38. Effluent discharge of discharge line denitrification reactor.
39. Influent stream before discharge line denitrification reactor said stream being derived from the effluent stream from the nitrification reactor.
40. Sludge from buffer tank containing effluent from the nitrification reactor.
41. Sludge discharge from buffer tank destined for recycling.
42. Surplus sludge discharge from sludge being recycled.

We claim:

1. Method for processing manure, liquid manure and/or Kjeldahl-N containing waste water being subjected to a nitrification in an aerated nitrification reactor (9) which contains active sludge rich in nitrifying bacteria being used in the nitirification reactor (9) if necessary and to a denitrification in a high rate recirculation denitrification reactor (13) which contains a very compact biomass which is capable of converting nitrate to nitrogen gas and to which an organic substrate is supplied obtained from the denitrification step in the nitrification reactor (9), characterized in that the loading of the nitrification reactor (9) is controlled to obtain an optimal nitrification and denitrification on the basis of one or more of the following data;

the incoming nitrogen load;

the information from a WAZU respiration meter (not shown);

the oxygen concentration in the nitrification reactor (9);

the pH value in the nitrification reactor (9), the criterion for which is that the pH value is in the range limited by 6 and 8.5;

the amount of air required the residence time the temperature in both the nitrification reactor (9) and the recirculation denitrification reactor (13) is kept below 40° C.;

the concentration of oxidized nitrogen in the influent for the recirculation denitrification reactor (13), the criterion for which is that the concentration is between 0 and 4 g N/1;

the concentration of oxidized nitrogen in the nitrification reactor (9), the criterion for which in the sludge/liquid mixture in the nitrification reactor is that the concentration is between 0 and 4 g N/1;

the concentration of the carbon source in the effluent from the recirculation denitrification reactor (13);

the gas production in the recirculation denitrification reactor (13)

the effluent from the nitrification reactor (9) partially being passed to the recirculation dentrification reactor (13), adding a source of carbon to the effluent to be passed to the recirculation denitrification reactor (13) and passing another portion of the effluent stream from the nitrification reactor (9) to a separation step (19) to separate a sludge, mixture in the nitrification reactor is that the concentration is between 0 and 4 g N/1;

the concentration of the carbon source in the effluent from the recirculation denitrification reactor (13);

the gas production in the recirculation denitrification reactor (13)

the effluent from the nitrification reactor (9) partially being passed to the recirculation denitrification reactor (13), adding a source of carbon to the effluent to be passed to the recirculation denitrification reactor (13) and passing another portion of the effluent stream from the nitrification reactor (9) to a separation step (19) to separate a sludge, the effluent from separation step (19) being passed to a discharge line denitrification reactor (37) under the addition of a carbon source if desired, the discharge line denitrification reactor (37) being provided with means for an effluent discharge (38) and a nitrogen discharge (17).

2. The method according to claim 1, characterized in that the effluent (12) from the nitrification reactor (9) is passed through a buffer tank, provided a) with a means to remove sludge and b) a discharge leading to stream (39) to separation step (19) with and a discharge leading to stream (36) leading to discharge line denitrification reactor 37 and buffer tank and c) further being provided with a discharge (19) leading to stream (12) leading to recirculation denitrification reactor (13).

3. The method according to claim 1, characterized in that liquid from the recirculation denitrification reactor (13) is recycled to the nitrification reactor (9).

4. The method according to claim 3, characterized in that the effluent stream 12 from the nitrification reactor (9) passed to the separation step (19) is subjected to a physical chemical treatment.

5. The method according to claim 4, wherein the flocculating substance comprises iron chloride.

6. The method according to claim 5, wherein the recycled liquid of the effluent from the recirculation denitrification reactor (13) is passed to the nitrification reactor (9) via a spray installation.

7. The method according to claim 6, characterized in that the recycled liquid is passed to the nitrification reactor (9) via a spray installation.

8. The method according to claim 7, characterized in that part of the effluent (12) is also recycled to the influent of the recirculation denitrification reactor (13).

9. The method according to claim 1, characterized in that the nitrification reactor (9) used is a batch reactor or a fed batch reactor (with a continuous or batchwise addition of influent).

10. The method according to claim 1, characterized in that chemicals for phosphate precipitation are added to at least one of the denitrification reactors (13 and/or 37).

11. The method according to claim 9, wherein an organic substance or a mixture of organic substances is added to at least one of the denitrification reactors, wherein a ratio between chemical oxygen consumption and total organic carbon (COC/TOC ratio) of greater than 3.75 is maintained.

12. The method according to claim 10, characterized in that methanol is added as an organic substrate to at least one of the denitrification reactors (13) and/or (37).

13. The method according to claim 11, characterized in that glycol is added as organic substrate to at least one of the denitrification reactors (13) and/or (37).

14. The method according to claim 13, with which an organic substance or a mixture of organic substance is added to at least one of the denitrification reactors (13) and/or (37), characterized in that a ratio between chemical oxygen consumption and total organic carbon (COC/TOC ratio) of less than or equal to 3.75 is maintained.

15. The method according to claim 14, characterized in that the influent to be treated is fully or partially supplied to the recirculation denitrification reactor (13).

16. The method according to claim 1, characterized in that one or more acid-neutralizing chemicals are added to the nitrification reactor (9).

17. The method according to claim 1, wherein the temperature in both the nitrification reactor (9) and in the denitrification reactors (13 and 37) is maintained at 20°–35° Celsius.

18. The method according to claim 17, wherein the concentration of oxidized nitrogen in the influent for the denitrification reactors is maintained at 1.0–1.4 g N/1.

19. The method according to claim 1, characterized in that the temperature in both the nitrification reactor (9) and in the denitrification reactors (13 and 37) is maintained at 20°–35° Celsius.

20. The method according to claim 1, wherein the loading of the nitrification reactor (9) is controlled to obtain the desired nitrification and denitrification on the basis of the incoming nitrogen load of said waste water.

21. The method according to claim 1, wherein the loading of the nitrification reactor (9) is controlled to obtain the desired nitrification and denitrification on the basis of the information from a WAZU respiration meter.

22. An apparatus comprising:

a nitrification reactor (9) which is provided with an aeration (10), feed of liquid (7) to be treated, with a feed of acid-neutralizing chemicals (8), active sludge rich in nitrifying bacteria, a sludge discharge (11), an effluent discharge (12);

a line (12) through which a part of the effluent (15) from the nitrification reactor (9) can be fed to the recirculation denitrification reactor (13);

a recirculation denitrification reactor (13) which is provided with a feed of effluent (12) from the nitrification reactor (9), a feed of a carbon source (14), a discharge (17), effluent discharge (16, 33 or 34) to reactor (9); characterized in that the installation (shown schematically in FIG. 11) is constructed such that part of the effluent from reactor (9) is passed to recirculation denitrification reactor (13) and part is passed to separation unit (19) provided with a sludge discharge (29) and an effluent discharge (36) connected with a discharge line denitrification reactor (37) with an effluent discharge (38) and a nitrogen outlet (17).

23. Apparatus according to claim 22, characterized in that it is provided with a feed of chemicals for phosphate precipitation (20).

24. Apparatus according to claim 22, characterized in that this is provided with buffer tanks (23).

25. Apparatus according to claim 24, characterized in that it is provided with a means for chemical phosphate precipitation (not shown) arranged between separation step (19) and the discharge line denitrification reactor (37).

26. Apparatus according to claim 25, characterized in that it is provided with means to catch sludge after a buffer tank and/or a denitrification reactor.

27. Apparatus according to claim 26, characterized in that a buffer tank is provided with means to remove sludge.

28. Apparatus according to claim 27, characterized in that discharge (38) of the discharge line denitrification reactor is provided with means to remove sludge.

29. Apparatus according to claim 28, characterized in that it is provided with means to recirculate sludge from a buffer tank to a circulation denitrification reactor (13) and/or from a buffer tank to the nitrification reactor (9) to said discharge line denitrification reactor (37).

30. The method according to claim 1, wherein the loading of the nitrification reactor (9) is controlled to obtain the desired nitrification and denitrification on the basis of the gas production in the recirculation denitrification reactor (13).

31. An apparatus comprising:

a nitrification reactor (9) having an aerator (10), feed of liquid (7) to be treated, a feed of acid-neutralizing chemicals (8), active sludge rich in nitrifying bacteria, a sludge discharge (11), and an effluent discharge (12);

a recirculation denitrification reactor (13) having an inlet, a feed of a carbon source (14), a nitrogen discharge means (17), and a recirculating effluent discharge (16, 33 or 34 to the nitrification reactor (9);

a discharge line denitrification reactor (37) having an inlet, an effluent discharge (38) and a nitrogen outlet (17);

means for feeding a part of the effluent (12) from the nitrification reactor (9) to the inlet of the recirculation denitrification reactor (13) and the remaining part to a separation unit (19) having a sludge discharge (29) and an effluent discharge (36) connected with the inlet of the discharge line denitrification reactor (37).

32. The apparatus according to claim 31, wherein said apparatus further includes a feed of chemicals for phosphate precipitation (20) to at least one denitrification reactor.

33. The apparatus according to claim 31, wherein said apparatus further includes at least one buffer tank (23) between and nitrification tank and said separation unit.

34. The apparatus according to claim 33, wherein said apparatus further includes a means for chemical phosphate precipitation arranged between the separation unit (19) and the discharge line denitrification reactor (37).

35. The apparatus according to claim 34, wherein said apparatus further includes means to catch sludge after the buffer tank and/or one of the denitrification reactors.

36. The apparatus according to claim 34, wherein the buffer tank includes means to remove sludge.

37. The apparatus according to claim 36, wherein the discharge (38) of the discharge line denitrification reactor includes means to remove sludge.

38. The apparatus according to claim 37, wherein said apparatus further includes means to recirculate sludge from the buffer tank to the recirculation denitrification reactor (13) and/or from the buffer tank to the nitrification reactor (9) and/or from the discharge line denitrification reactor (37) to the discharge line denitrification reactor (37).

* * * * *

UNITED STATES PATENT AND TRADEMARK OFFICE
CERTIFICATE OF CORRECTION

PATENT NO. : 5,290,451

DATED : Mar. 1, 1994

INVENTOR(S) : Koster et al.

It is certified that error appears in the above-indentified patent and that said Letters Patent is hereby corrected as shown below:

TITLE PAGE

| | |
|---|---|
| Under U.S. Patent Documents, reference Levin et al. | "3,730,887" should be --3,73[illegible] |
| Under U.S. Patent Documents, reference "Fuchs" | "9,415,454" should be --4,415,454-- |
| Under Other Publications, line 11 | "195(C-183" should be --195(C-1[illegible]-- |
| Col. 4, line 25 | After "is" (second occurrence in application) insert --in the range limited by 0 and 1.5 g N/1. Furthermore, it has-- |
| Col. 4, line 30 | After "be" insert --recycled. This recycling provides dilution of the concentration-- |

UNITED STATES PATENT AND TRADEMARK OFFICE
CERTIFICATE OF CORRECTION

PATENT NO. : 5,290,451

DATED : Mar. 1, 1994
INVENTOR(S) : Koster et al.

It is certified that error appears in the above-indentified patent and that said Letters Patent is hereby corrected as shown below:

Col. 6, lines 42-60 Delete the following heading and paragraph: "DETAILED DESCRIPTION OF THE PREFERRED EMBODIMENTS It has now been found that an improvement can be reached by partially recirculating the effluent (12) from the nitrification reactor (9) to a recirculation denitrification reactor (13), adding a source of carbon to the effluent to be passed to the recirculation denitrification reactor (13) and passing part of the effluent stream (12) from the nitrification reactor (9) to a separation unit (19) to separate sludge, the effluent (36) from the separation step (19) is passed to another denitrification reactor (37). This other denitrification reactor (37) shall be referred to as the discharge line denitrification reactor (37). A source of carbon should be added to the discharge line. The effluent (38) from the discharge line denitrification reactor (37) can be discarded. The scheme of the apparatus is shown in FIG. 11.

The following advantages are achieved:"

UNITED STATES PATENT AND TRADEMARK OFFICE
CERTIFICATE OF CORRECTION

PATENT NO. : 5,290,451 Page 3 of 3

DATED : Mar. 1, 1994

INVENTOR(S) : Koster et al.

Figure 16:
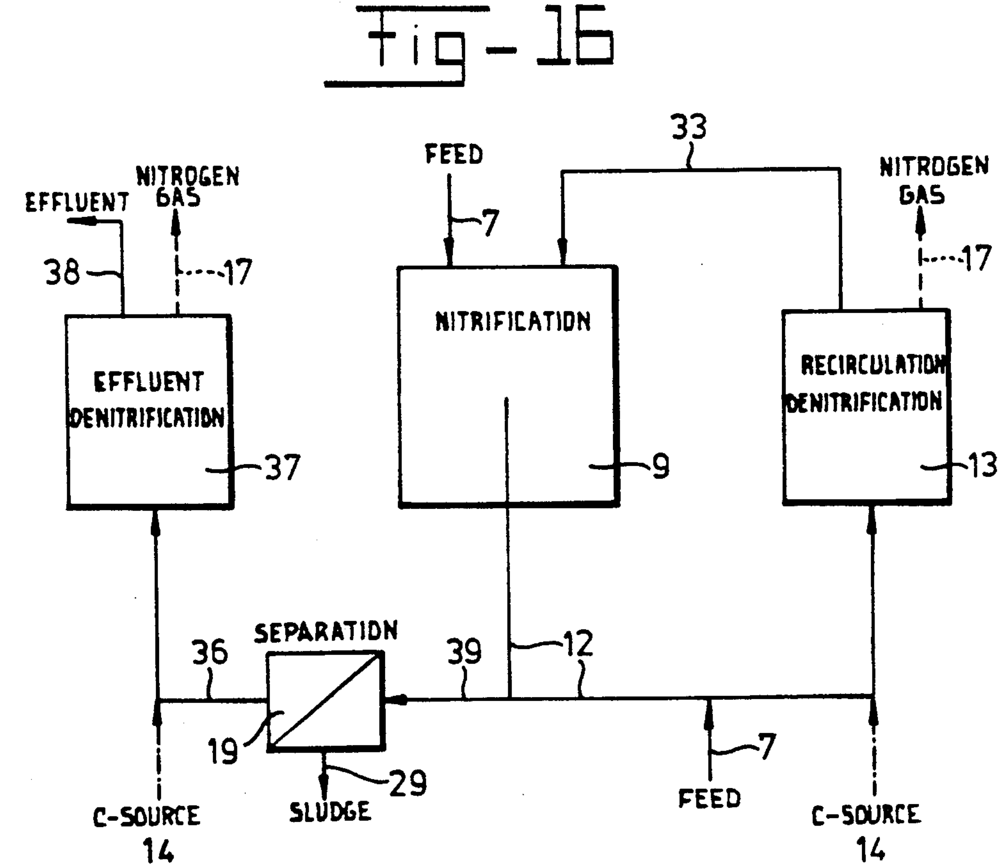
Figure 17:
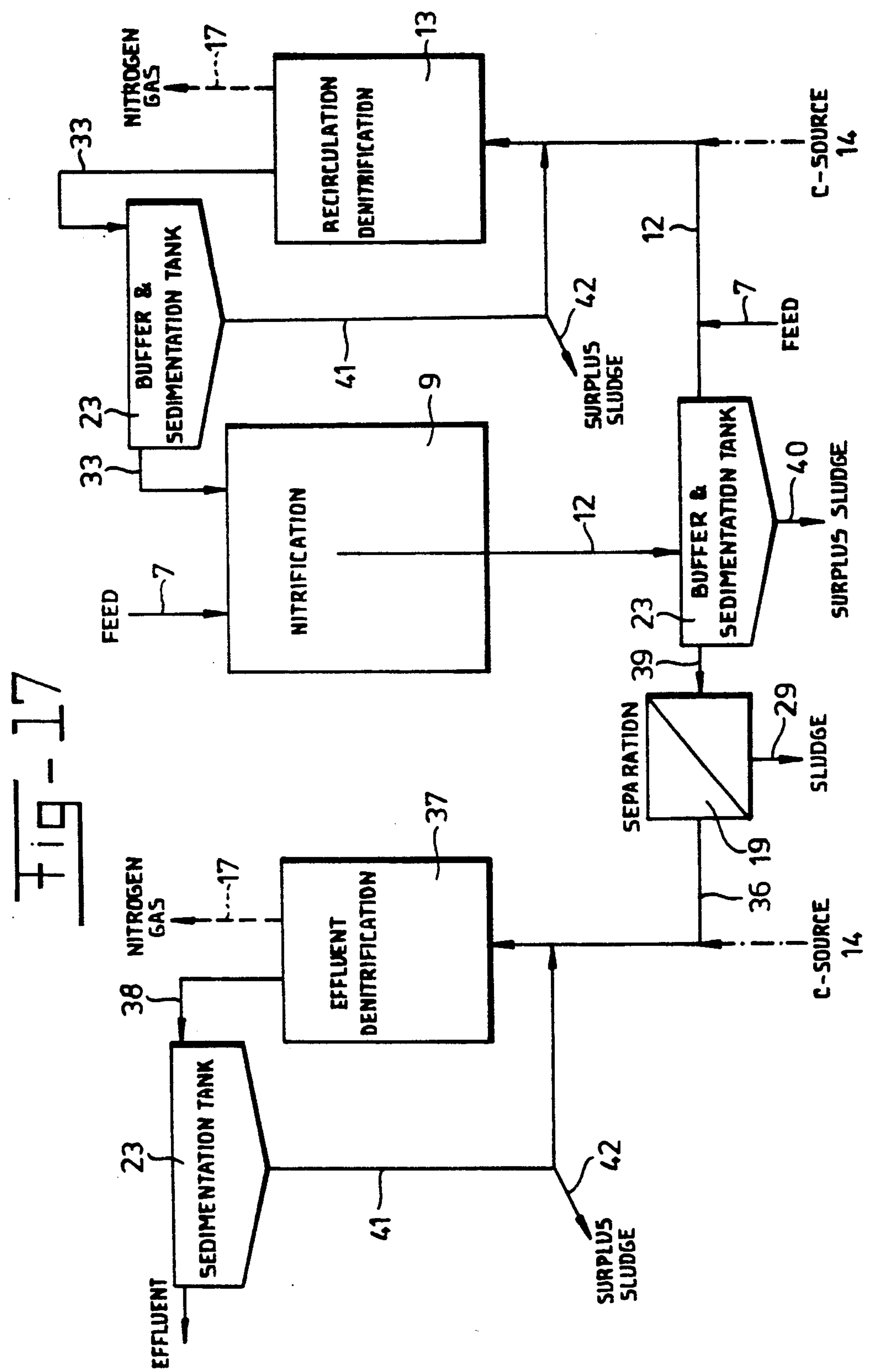
FIG. 17 is a process flow schematic of processing manure wherein the effluents of the discharge line denitrification reactor, the recirculation denitrification reactor and the nitrification reactor can be collected in a sedimentation tank.

It is certified that error appears in the above-indentified patent and that said Letters Patent is hereby corrected as shown below:

| | |
|---|---|
| Col. 7, after line 41 | insert --Figure 16 is a slightly modified flow diagram, similar to the diagram of Figure 12.-- |
| Col. 9, line 57 | after "exigencies" insert --.-- |
| Col. 11, line 46 | "K" should be --K.-- |
| Col. 11, line 47 | after "Chem.," insert --4.-- |
| Col. 11, line 66 | "13" should be --13-- |
| Col. 13, line 57 | after "batch" insert --reactor with a stepwise addition (0, 5 $m^3$ of manure per step) of-- |

Signed and Sealed this

Twenty-seventh Day of June, 1995

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

Column 16, lines 17- 68, and columns 17-20 ( Claims 1-38 ), should be deleted, and subtitute therefor the following claims 1-38.

1. A method for processing manure, liquid manure and/or Kjeldahl-N containing waster water comprising subjecting the waste water to a nitrification in an aerated nitrification reactor (9) which contains active sludge rich in nitrifying bacteria for use in the nitrification step and which discharges effluent, subjecting part of the effluent from the nitrification reactor (9) to a denitrification in a recirculation denitrification reactor (13) which contains a very compact biomass which is capable of converting nitrate to nitrogen gas and to which an organic substrate is supplied, adding a source of carbon to the part of the effluent from the nitrification reactor (9) passed to the recirculation denitrification reactor (13), and recirculating effluent from said recirculation denitrification reactor to said nitrification reactor passing the remaining part of the effluent from the nitrification reactor (9) to a separation step (19) to separate sludge, the effluent from the separation step (19)

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

being passed to a discharge line denitrification reactor (37) having means for an effluent discharge (38), a feed of carbon source and a nitrogen discharge (17), wherein the loading of the nitrification reactor (9) is controlled to obtain a desired nitrification and denitrification.

2. The method according to claim 1, wherein the effluent (12) from the nitrification reactor (9) is first passed through a buffer tank (23), the buffer tank (23) having a) means to remove sludge, b) a discharge leading to the separation step (19), the separation step (19) having a discharge leading to the denitrification reactor (37), and c) a discharge leading to the recirculation denitrification reactor (13).

3. The method according to claim 2, wherein the part of the effluent from the nitrification reactor (9) passed to the separation step (19) is subjected to a physical chemical treatment.

UNITED STATES PATENT AND TRADEMARK OFFICE

CERTIFICATE OF CORRECTION

PATENT NO. : 5,290,451
DATED : March 1, 1994
INVENTOR(S) : Koster et al.

It is certified that error appears in the above-indentified patent and that said Letters Patent is hereby corrected as shown below:

4. The method according to claim 3, further comprising adding to the part of the effluent from the nitrification reactor (9) passed to the separation step (10) a flocculating substance containing cations which can precipitate with phosphate.

5. The method according to claim 4, wherein the flocculating substance comprises iron chloride.

6. The method according to claim 5, wherein the recycled liquid of the effluent from the recirculation denitrification reactor (13) is passed to the nitrification reactor (9) via a spray installation.

7. The method according to claim 1, wherein the nitrification reactor (9) used is a batch reactor or a fed batch reactor.

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

8. The method according to claim 1, wherein chemicals for phosphate precipitation are added to at least one of the denitrification reactors.

9. The method according to claim 8, wherein the cations of the chemicals for phosphate precipitation are selected from the group consisting of $Ca^{2+}$, $Fe^{2+}$, $Fe^{3+}$ $Mg^{2+}$ and $Al^{3+}$.

10. The method according to claim 8, wherein methanol is added as an organic substrate to at least one of the denitrification reactors.

11. The method according to claim 9, wherein glycol is added as an organic substrate to at least one of the denitrification reactors.

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

12. The method according to claim 9, wherein an organic substance or a mixture of organic substances is added to at least one of the denitrification reactors, wherein a ratio between chemical oxygen consumption and total organic carbon (COC/TOC ratio) of greater than 3.75 is maintained.

13. The method according to claim 12, wherein the waste water to be treated is fully or partially supplied to the recirculation denitrification reactor (13).

14. The method according to claim 1, wherein one or more acid-neutralizing chemicals are added to the nitrification reactor (9).

15. The method according to claim 14, wherein the acid neutralizing chemical is lime.

UNITED STATES PATENT AND TRADEMARK OFFICE
CERTIFICATE OF CORRECTION

PATENT NO. : 5,290,451
DATED : March 1, 1994
INVENTOR(S) : Koster et al.

It is certified that error appears in the above-indentified patent and that said Letters Patent is hereby corrected as shown below:

16. The method according to claim 14, wherein the pH value in the nitrification reactor (9) is maintained at 7-8.

17. The method according to claim 1, wherein the temperature in both the nitrification reactor (9) and in the denitrification reactors (13 and 37) is maintained at 20-35° Celsius.

18. The method according to claim 17, wherein the concentration of oxidized nitrogen in the influent for the denitrification reactors is maintained at 1.0-1.4 N/1.

Claim 19 (allowed claim 21) should read as follows:

19. The method according to claim 18, wherein the concentration of oxidized nitrogen in the nitrification reactor is maintained at 0-1.5 g N/1.

20. The method according to claim 1, wherein the loading of the nitrification reactor (9) is controlled to obtain the desired nitrification and denitrification on the basis

CERTIFICATE OF CORRECTION

PATENT NO. : 5,290,451
DATED : March 1, 1994
INVENTOR(S) : Koster et sl.

It is certified that error appears in the above-indentified patent and that said Letters Patent is hereby corrected as shown below:

of the incoming nitrogen loan of said waste water.

21. The method according to claim 1, wherein the loading of the nitrification reactor (9) is controlled to obtain the desired nitrification and denitrification on the basis of the information from a WAZU respiration meter.

22. The method according to claim 1, wherein the loading of the nitrification reactor (9) is controlled to obtain the desired nitrification and denitrification on the basis of the oxygen concentration in the nitrification reactor (9).

23. The method according to claim 1, wherein the loading of the nitrification reactor (9) is controlled to obtain the desired nitrification and denitrification on the basis of the pH value in the nitrification reactor (9), the criterion for which is that the pH value is in the range limited by 6 and 8.5.

UNITED STATES PATENT AND TRADEMARK OFFICE

CERTIFICATE OF CORRECTION

PATENT NO. : 5,290,451
DATED : March 1, 1994
INVENTOR(S) : Koster et al.

It is certified that error appears in the above-indentified patent and that said Letters Patent is hereby corrected as shown below:

24. The method according to claim 1, wherein the loading of the nitrification reactor (9) is controlled to obtain the desired nitrification and denitrification on the basis of the amount of air required by the nitrification reactor (9).

25. The method according to claim 1, wherein the loading of the nitrification reactor (9) is controlled to obtain the desired nitrification and denitrification on the basis of the residence time.

26. The method according to claim 1, wherein the loading of the nitrification reactor (9) is controlled to obtain the desired nitrification and denitrification by maintaining the temperature in both the nitrification reactor (9) and the recirculation denitrification reactor (13) below 40°C.

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

27. The method according to claim 1, wherein the loading of the nitrification reactor (9) is controlled to obtain the desired nitrification and denitrification on the basis of the concentration of oxidized nitrogen in the influent for the recirculation denitrification reactor (13), the criterion for which is that the concentration is between 0 and 4 g N/1.

28. The method according to claim 1, wherein the loading of the nitrification reactor (0) is controlled to obtain the desired nitrification and denitrification on the basis of the concentration of oxidized nitrogen in the nitrification reactor (9), the criterion for which is the sludge/liquid mixture in the nitrification reactor (9) is that the concentration is between 0 and 4 g N/1.

29. The method according to claim 1, wherein the loading of the nitrification reactor (9) is controlled to obtain the desired nitrification and denitrification on the basis of the concentration of the carbon source in the effluent from the recirculation denitrification reactor (13).

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

30. The method according to claim 1, wherein the loading of the nitrification reactor (9) is controlled to obtain the desired nitrification and denitrification on the basis of the gas production in the recirculation denitrification reactor (13).

31. An apparatus comprising:

a nitrification reactor (9) having an aerator (10), feed of liquid (7) to be treated, a feed of acid-neutralizing chemicals (8), active sludge rich in nitrifying bacteria, a sludge discharge (11), and an effluent discharge (12);

a recirculation denitrification reactor (13) having an inlet of influent through the line (12) from the nitrification reactor, a feed of a carbon source (14), a nitrogen discharge means (17), and a recirculating effluent discharge (16, 33 or 34) to the nitrification reactor (9);

a discharge line denitrification reactor (37) having an inlet, an effluent discharge (38) and a nitrogen outlet (17);

CERTIFICATE OF CORRECTION

PATENT NO. : 5,290,451
DATED : March 1, 1994
INVENTOR(S) : Koster et al.

It is certified that error appears in the above-indentified patent and that said Letters Patent is hereby corrected as shown below:

means for feeding a part of the effluent (12) from the nitrification reactor (9) to the inlet of the recirculation denitrification reactor (13) and the remaining part to a separation unit (19) having a sludge discharge (29) and an effluent discharge (36) connected with the inlet of the discharge line denitrification reactor (37).

32. The apparatus according to claim 31, wherein said apparatus further includes a feed of chemicals for phosphate precipitation (20) to at least one denitrification reactor.

33. The apparatus according to claim 31 (allowed claim 24), wherein said apparatus further includes at least one buffer tank (23) between said nitrification tank and said separation unit.

UNITED STATES PATENT AND TRADEMARK OFFICE

CERTIFICATE OF CORRECTION

PATENT NO. : 5,290,451

DATED : March 1, 1994

INVENTOR(S) : Koster et al.

It is certified that error appears in the above-indentified patent and that said Letters Patent is hereby corrected as shown below:

34. The apparatus according to claim 33 (allowed claim 25), wherein said apparatus further includes a means for chemical phosphate precipitation arranged between the separation unit (19) and the discharge line denitrification reactor (37).

35. The apparatus according to claim 34 (allowed claim 26), wherein said apparatus further includes means to catch sludge after the buffer tank and/or one of the denitrification reactors.

36. The apparatus according to claim 34 (allowed claim 22), wherein the buffer tank includes means to remove sludge.

37. The apparatus according to claim 36 (allowed claim 28), wherein the

UNITED STATES PATENT AND TRADEMARK OFFICE

CERTIFICATE OF CORRECTION

PATENT NO. : 5,290,451
DATED : March 1, 1994
INVENTOR(S) : Koster et al.

It is certified that error appears in the above-indentified patent and that said Letters Patent is hereby corrected as shown below:

discharge (38) of the discharge line denitrification reactor includes means to remove sludge.

38. The apparatus according to claim 37 (allowed claim 29), wherein said apparatus further includes means to recirculate sludge from the buffer tank to the recirculation denitrification reactor (13) and/or from the buffer tank to the nitrification reactor (9) and/or front eh discharge line denitrification reactor (37) to the discharge line denitrification reactor (37).

Signed and Sealed this

Seventh Day of May, 1996

Attest:

BRUCE LEHMAN

Attesting Officer

Commissioner of Patents and Trademarks